United States Patent
Edge

(10) Patent No.: US 11,470,446 B2
(45) Date of Patent: *Oct. 11, 2022

(54) SYSTEMS AND METHODS FOR SUPPORTING CONTROL PLANE LOCATION IN A FIFTH GENERATION WIRELESS NETWORK

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,416

(22) Filed: Oct. 30, 2019

(65) Prior Publication Data

US 2020/0068355 A1    Feb. 27, 2020

Related U.S. Application Data

(63) Continuation of application No. 15/862,562, filed on Jan. 4, 2018, now Pat. No. 10,516,971.
(Continued)

(51) Int. Cl.
*H04W 4/029* (2018.01)
*H04M 3/51* (2006.01)
(Continued)

(52) U.S. Cl.
CPC ......... *H04W 4/029* (2018.02); *H04M 3/5116* (2013.01); *H04W 4/02* (2013.01);
(Continued)

(58) Field of Classification Search
CPC ......... H04W 4/029; H04W 4/02; H04W 4/20; H04W 4/90; H04M 3/5116; H04M 2242/04; G08B 25/08; G08B 25/016
See application file for complete search history.

(56) References Cited

U.S. PATENT DOCUMENTS

| | | |
|---|---|---|
| 9,510,317 B1 | 11/2016 | Bansal |
| 9,998,872 B2 | 6/2018 | Jiang et al. |
| 2011/0143771 A1* | 6/2011 | Edge ............... H04W 4/20 |
| | | 455/456.1 |

(Continued)

FOREIGN PATENT DOCUMENTS

WO    WO-2015123356 A2    8/2015

OTHER PUBLICATIONS

3GPP TR 23.891: "3rd Generation Partnership Project; Technical Specification Group Services and System Aspects; Evaluation of LCS Control Plane Solutions for EPS (Release 9)", 3GPP Standard; 3rd Generation Partnership Project (3GPP), Mobile Competence Centre; 650, Route Des Lucioles; F-06921 Sophia-Antipolis Cedex; France, No. V.9.0.0, Mar. 17, 2009 (Mar. 17, 2009), pp. 1-64.

(Continued)

*Primary Examiner* — Mazda Sabouri
(74) *Attorney, Agent, or Firm* — Qualcomm Incorporated

(57) ABSTRACT

Methods and techniques are described for supporting location services for a user equipment (UE) in a Fifth Generation wireless network using a Location Management Function (LMF) based control plane (CP) location solution. The LMF serves as the main anchor point for location support instead of an Access and Mobility Management Function (AMF). The LMF may be in either a serving Public Land Mobile Network (PLMN) for a UE or in a Home PLMN for a roaming UE. The LMF may obtain location information for a UE via an AMF from a Next Generation Radio Access Network or the UE and may interact with a Gateway Mobile Location Center to receive location requests from and return location information to an external client. The LMF solution may be more efficient and require less implementation than an AMF based CP location solution.

36 Claims, 20 Drawing Sheets

Related U.S. Application Data

(60) Provisional application No. 62/491,216, filed on Apr. 27, 2017, provisional application No. 62/471,907, filed on Mar. 15, 2017, provisional application No. 62/455,521, filed on Feb. 6, 2017, provisional application No. 62/452,936, filed on Jan. 31, 2017, provisional application No. 62/446,329, filed on Jan. 13, 2017, provisional application No. 62/444,356, filed on Jan. 9, 2017.

(51) Int. Cl.
*H04W 4/02* (2018.01)
*H04W 4/20* (2018.01)
*G08B 25/01* (2006.01)
*G08B 25/08* (2006.01)
*H04W 4/90* (2018.01)

(52) U.S. Cl.
CPC ............ *H04W 4/20* (2013.01); *G08B 25/016* (2013.01); *G08B 25/08* (2013.01); *H04M 2242/04* (2013.01); *H04W 4/90* (2018.02)

(56) References Cited

U.S. PATENT DOCUMENTS

| | | | |
|---|---|---|---|
| 2012/0220312 A1* | 8/2012 | Nishida | G01S 5/02 455/456.1 |
| 2016/0014586 A1 | 1/2016 | Stupar et al. | |
| 2016/0157253 A1 | 6/2016 | Yamine et al. | |
| 2018/0199160 A1 | 7/2018 | Edge | |

OTHER PUBLICATIONS

3GPP TS 23.002: "3rd Generation Partnership Project; Technical Specification Group Services and System Aspects; Network architecture (Release 13)", 3GPP Standard; Technical Specification; 3rd Generation Partnership Project (3GPP), Mobile Competence Centre; 650, Route Des Lucioles; F-06921 Sophia-Antipolis Cedex; France, vol. SA WG2, No. V13.7.0, Sep. 26, 2016 (Sep. 26, 2016), pp. 1-112, XP051295326, [retrieved on Sep. 26, 2016].
3GPP TS 23.271: "3rd Generation Partnership Project; Technical Specification Group Services and System Aspects; Functional stage 2 description of Location Services (LCS) (Release 14)", 3GPP Standard; 3rd Generation Partnership Project (3GPP), Mobile Competence Centre ; 650, Route Des Lucioles ; F-06921 Sophia-Antipolis Cedex; France, vol. SA WG2, No. V14.0.0, Dec. 16, 2016 (Dec. 16, 2016), pp. 1-180, XP051229995, [retrieved on Dec. 16, 2016].
International Search Report and Written Opinion—PCT/US2018/012611—ISA/EPO—dated Apr. 23, 2018.
Qualcomm Incorporated: "Location Services Alternatives for 5G System Architecture and 5G Procedures", 3GPP Draft; S2-170819 (Location Services for 5G System Architecture and Procedures)—V3, 3rd Generation Partnership Project (3GPP), Mobile Competence Centre; 650, Route Des Lucioles; F-06921 Sophia-A, vol. SA WG2, No. Dubrovnik, Croatia; Feb. 13, 2017-Feb. 17, 2017, Feb. 13, 2017 (Feb. 13, 2017), 21 Pages, XP051216940, Retrieved from the Internet: URL: http://www.3gpp.org/ftp/Meetings_3GPP_SYNC/SA2/Docs/ [retrieved on Feb. 13, 2017].
Qualcomm Incorporated: "Location Services for 5G System Procedures", 3GPP Draft; S2-170821 (P-CR FORTS 23.502 for Location Services for 5G System Procedures), 3rd Generation Partnership Project (3GPP), Mobile Competence Centre; 650, Route Des Lucioles; F-06921 Sophi, vol. SA WG2, No. Dubrovnik, Croatia; Feb. 13, 2017-Feb. 17, 2017, Feb. 7, 2017 (Feb. 7, 2017), 12 Pages, XP051228112, Retrieved from the Internet: URL: http://www.3gpp.org/ftp/tsg_sa/WG2_Arch/TSGS2_119_Dubrovnik/Docs/ [retrieved on Feb. 7, 2017].
Taiwan Search Report—TW107100624—TIPO—dated Sep. 23, 2021.

* cited by examiner

SYSTEMS AND METHODS FOR SUPPORTING CONTROL PLANE LOCATION IN A FIFTH GENERATION WIRELESS NETWORK

CLAIM OF PRIORITY UNDER 35 U.S.C. § 119

This application is a continuation of U.S. application Ser. No. 15/862,562, entitled "SYSTEMS AND METHODS FOR SUPPORTING CONTROL PLANE LOCATION IN A FIFTH GENERATION WIRELESS NETWORK," filed Jan. 4, 2018, which claims under 35 USC § 119 the benefit of and priority to U.S. Provisional Application No. 62/444,356, filed Jan. 9, 2017, entitled "CONTROL PLANE LOCATION SOLUTION FOR A 5G NEXTGEN CORE," U.S. Provisional Application No. 62/446,329, filed Jan. 13, 2017, entitled "CONTROL PLANE LOCATION SOLUTION FOR A 5G NEXTGEN CORE," U.S. Provisional Application No. 62/452,936, filed Jan. 31, 2017, entitled "CONTROL PLANE LOCATION SOLUTION FOR A 5G NEXTGEN CORE," U.S. Provisional Application No. 62/455,521, filed Feb. 6, 2017, entitled "CONTROL PLANE LOCATION SOLUTION FOR A 5G NEXTGEN CORE," U.S. Provisional Application No. 62/471,907, filed Mar. 15, 2017, entitled "CONTROL PLANE LOCATION SOLUTION FOR A 5G NEXTGEN CORE," and U.S. Provisional Application No. 62/491,216, filed Apr. 27, 2017, entitled "CONTROL PLANE LOCATION SOLUTION FOR A 5G NEXTGEN CORE," all of which are assigned to the assignee hereof and are incorporated herein by reference in their entireties.

BACKGROUND

Background Field

The present disclosure relates generally to communication, and more specifically to techniques for supporting location services for user equipments (UEs) served by a Fifth Generation (5G) wireless network.

Relevant Background

The existing control plane (CP) location solution, referred to here as the traditional CP location solution, for 4G Long Term Evolution (LTE) access and EPC (Enhanced Packet Core) that is defined in 3GPP Technical Specifications (TSs) 23.271 and 36.305 has a number of limitations including high impact to a Mobility Management Entity (MME), difficulty in supporting location if there is an inter-MME handover or inter-MME cell change for a UE, and difficulty supporting location by an Home Public Land Mobile Network (HPLMN) for a roaming User Equipment (UE). If a corresponding solution is used for a Fifth Generation (5G) wireless network, corresponding limitations may remain. Accordingly, a different control plane location solution is desired for a 5G wireless network that may overcome some or all limitations of the traditional solution.

SUMMARY

Methods and techniques are described for supporting location services for a user equipment (UE) using a Location Management Function (LMF) based control plane (CP) location solution. The LMF serves as the main anchor point for location support instead of an Access and Mobility Management Function (AMF) thereby avoiding the requirement that the AMF maintain state information during location sessions or abort location sessions following any inter-AMF handover or cell change. The LMF may be in a Home Public Land Mobile Network (HPLMN) for a roaming UE thereby allowing location support in the HPLMN that is more customized to the UE and external client subscription requirements.

In one implementation, a method for supporting location services for a user equipment (UE) includes receiving by a first location server (e.g. an LMF) a first message for the UE transmitted by a first entity, wherein the first message comprises a Mobile Terminated Location Request (MT-LR), a Mobile Originated Location Request (MO-LR), an indication of an emergency call for the UE, or a periodic and triggered MT-LR; sending a second message to a second entity to request location information for the UE; receiving a third message from the second entity comprising the location information, wherein the location information is measured by the second entity; and determining a location for the UE based on the location information, wherein the first location server uses control plane interfaces and control plane protocols to receive the first message, send the second message and receive the third message.

In one implementation, a first location server (e.g. LMF) for supporting location services for a user equipment (UE) includes an external interface for receiving and sending messages to entities in a network; and at least one processor coupled to the external interface, the at least one processor configured to receive a first message for the UE transmitted by a first entity in the network, wherein the first message comprises a Mobile Terminated Location Request (MT-LR), a Mobile Originated Location Request (MO-LR), an indication of an emergency call for the UE, or a periodic and triggered MT-LR, sending a second message to a second entity in the network to request location information for the UE, receive a third message from the second entity comprising the location information, wherein the location information is measured by the second entity, and determine a location for the UE based on the location information, wherein the first location server uses control plane interfaces and control plane protocols to receive the first message, send the second message and receive the third message.

In one implementation, a method for supporting location services for a user equipment (UE) includes receiving by a first location server (e.g. a Gateway Mobile Location Center (GMLC)) a first message for the UE transmitted by a first entity, wherein the first message comprises one of a request for a location of the UE, a request for a periodic and triggered location of the UE, or an indication of an emergency call for the UE; determining a second location server; sending a second message to the second location server to request location information for the UE; receiving a third message from the second location server comprising the location information; and sending a fourth message to a second entity, the fourth message comprising the location information, wherein the first location server uses a control plane interface and a control plane protocol to send the second message and receive the third message.

In one implementation, a first location server (e.g. a GMLC) for supporting location services for a user equipment (UE) includes an external interface for receiving and sending messages to entities in a network; and at least one processor coupled to the external interface, the at least one processor configured to receive a first message for the UE transmitted by a first entity, wherein the first message comprises one of a request for a location of the UE, a request for a periodic and triggered location of the UE, or an indication of an emergency call for the UE, determine a second location server, send a second message to the second location server to request location information for the UE, receive a third message from the second location server comprising the location information, and send a fourth message to a second entity, the fourth message comprising the location information, wherein the first location server uses a control plane interface and a control plane protocol to send the second message and receive the third message.

In one implementation, a method for supporting location services for a user equipment (UE) includes receiving by the UE a first message from a first location server, the first message requesting location information for the UE; obtaining the location information; and sending a second message to the first location server, the second message comprising the location information, wherein the UE uses control plane interfaces and control plane protocols to receive the first message and send the second message; wherein the first location server sends the first message in response to receiving one of a Mobile Terminated Location Request (MT-LR), a Mobile Originated Location Request (MO-LR), an indication of an emergency call for the UE, or a periodic and triggered MT-LR, wherein the first location server determines a location for the UE based on the location information.

In one implementation, a user equipment (UE) for supporting location services includes a wireless transceiver for receiving and sending messages to entities in a network; and at least one processor coupled to the wireless transceiver, the at least one processor configured to receive a first message from a first location server, the first message requesting location information for the UE, obtain the location information; and sending a second message to the first location server, the second message comprising the location information, wherein the UE uses control plane interfaces and control plane protocols to receive the first message and send the second message, wherein the first location server sends the first message in response to receiving one of a Mobile Terminated Location Request (MT-LR), a Mobile Originated Location Request (MO-LR), an indication of an emergency call for the UE, or a periodic and triggered MT-LR, wherein the first location server determines a location for the UE based on the location information.

BRIEF DESCRIPTION OF THE DRAWINGS

An understanding of the nature and advantages of various embodiments may be realized by reference to the following figures.

Figure 1:
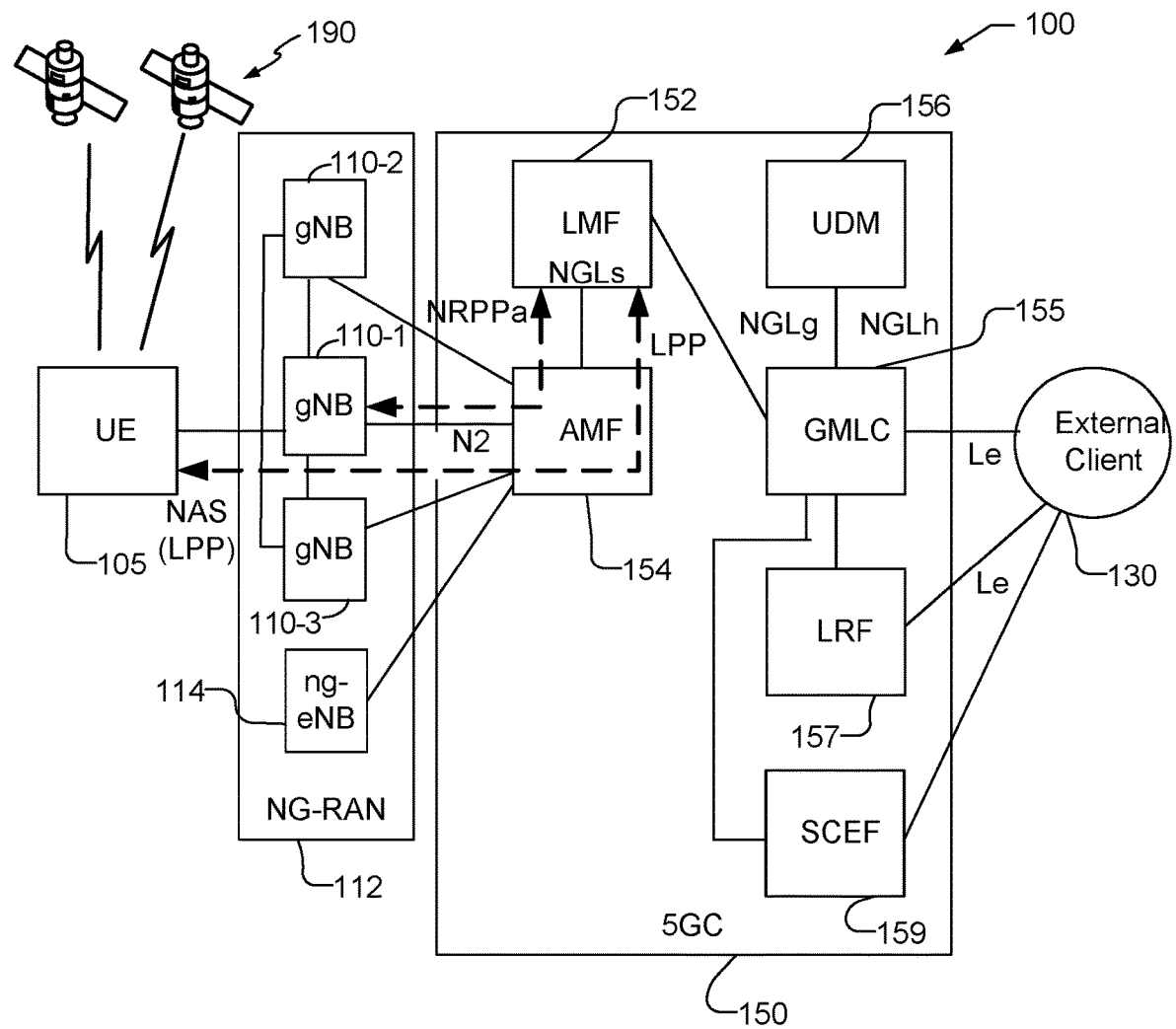
FIG. 1 is a block diagram illustrating a non-roaming reference architecture for a Location Management Function (LMF) based control plane (CP) location solution in a wireless network.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 152 may be indicated as 152V, 152H, 152S and 152T. When referring to such an element using only the first number, any instance of the element is to be understood (e.g. elements 110 in the previous example would refer to elements 110-1, 110-2 and 110-3, and element 152 in the previous example would refer to elements 152V, 152H, 152S and 152T).

DETAILED DESCRIPTION

In a control plane (CP) location solution, such as the CP location solution for the Third Generation Partnership Project (3GPP) defined in 3GPP Technical Specification (TS) 23.271 and 3GPP TS 36.305, signaling (e.g. including positioning related messages) to support location of mobile devices may be transferred between participating entities (e.g. the GMLC 155, gNB 110 and UE 105 described later for FIG. 1) using existing signaling interfaces and protocols for normal 3GPP network operation. In contrast, in a user plane (UP) location solution such as the Secure User Plane Location (SUPL) solution defined by the Open Mobile Alliance (OMA), signaling (e.g. such as SUPL messages carrying embedded positioning protocol messages) to support location of a mobile device may be transferred between participating entities (e.g., the mobile device and a SUPL Location Platform (SLP)), using data bearers (e.g. using the Internet Protocol (IP)).

In a traditional type of CP location solution, as defined for example for wireless access using Second Generation (2G) Global System for Mobile Communications (GSM), Third Generation (3G) Universal Mobile Telecommunications System (UMTS) or Fourth Generation (4G) Long Term Evolution (LTE), location support and location procedures may be provided using a core network access node as the main anchor point for location services. The core network access node may be a Mobile Switching Center (MSC) or Serving General Packet Radio Service Support Node (SGSN) for GSM or UMTS access, or may be a Mobility Management Entity (MME) for LTE access. In a Fifth Generation (5G) core network (5GC), the core network access node used to support a CP location solution may be an Access and Mobility Management Function (AMF). However, this may lead to several undesirable consequences, as may also occur for CP location support in 2G, 3G and 4G networks. These consequences may include a significant implementation impact for an AMF, additional AMF processing due to a need to maintain state information for location sessions, a need to abort location sessions following an inter-AMF cell change or handover, and high network resource usage for periodic or triggered location sessions.

To mitigate or avoid undesirable consequences associated with a traditional CP location solution (e.g. as used for 2G, 3G and 4G wireless access), a Location Management Function (LMF) based location solution may be used, as described herein, for CP location support for a 5G wireless network. The LMF based solution is also referred to herein as a "5G Core Network (5GC) control plane (CP) location solution" or as a "5GC location solution."

FIG. 1 is a simplified block diagram illustrating a communication system 100 for non-roaming support of UE location using the 5GC CP location solution. The non-roaming communication system 100 comprises a UE 105 and components of a Fifth Generation (5G) network comprising a Next Generation Radio Access Network (NG-RAN) 112, which includes base stations (BSs) sometimes referred to as New Radio (NR) NodeBs or gNBs 110-1, 110-2 and 110-3 (collectively and generically referred to herein as gNBs 110), and a 5G Core Network (5GC) 150 that is in communication with an external client 130. A 5G network may also be referred to as a New Radio (NR) network; NG-RAN 112 may be referred to as an NR RAN or a 5G RAN; and 5GC 150 may be referred to as an Next Generation (NG) Core network (NGC). Standardization of an NG-RAN and 5GC is ongoing in the Third Generation Partnership Project (3GPP). Accordingly, NG-RAN 112 and 5GC 150 may conform to current or future standards for 5G support from 3GPP. The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), 802.11 WiFi etc.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GC 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 150 not shown in FIG. 1, or possibly via a Gateway Mobile Location Center (GMLC) 155) and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from satellites 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more satellites 190 with accurately known orbital data, or combinations thereof, based at least in part, on pilots, positioning reference signals (PRS) or other positioning related signals transmitted by the transmitters or satellites and received at the UE 105. Here, a location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS satellites 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, location servers may comprise an almanac which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110) in NG-RAN 112 to determine a location for UE 105.

In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GC 150 on behalf of the UE 105 using 5G (e.g. NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GC 150. Thus, the NG-RAN 112 may include any combination of gNBs, eNBs, or other types of base stations or access points. As an example, NG-RAN 112 may include one or more next generation eNBs (ng-eNBs) 114 which provide LTE wireless access to UE 105 and may connect to entities in 5GC 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location services requests for the UE 105, e.g., received from the GMLC 155. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105). The LMF 152 may be referred to by other names such as a Location Manager (LM), Location Function (LF), commercial LMF (CLMF) or value added LMF (VLMF).

The GMLC 155 may support a location request for the UE 105 received from an external client 130 and may forward such a location request to the LMF 152. A location response from the LMF 152 (e.g. containing a location estimate for the UE 105) may be similarly returned to the GMLC 155 and the GMLC 155 may then return the location response (e.g., containing the location estimate) to the external client 130. GMLC 155 may contain subscription information for an external client 130 and may authenticate and authorize a location request for UE 105 from external client 130. GMLC 155 may further initiate a location session for UE 105 by sending a location request for UE 105 to LMF 152 and may include in the location request an identity for UE 105 and the type of location being requested (e.g. such as a current location or a sequence of periodic or triggered locations). In contrast to a traditional CP location solution where a GMLC 155 may send a location request for UE 105 to a serving AMF for UE 105 (e.g. AMF 154), GMLC 155 may only send a location request for UE 105 to an LMF such as LMF 152. This may reduce impacts to AMFs (e.g. AMF 154) and may enable more efficient location of UE 105 as described further down herein.

As further illustrated in FIG. 1, the LMF 152 and the gNBs 110 may communicate using a New Radio Position Protocol A (which may be referred to as NPPa or NRPPa). NRPPa may be defined in 3GPP TS 38.455 and may be the same as, similar to, or an extension of the LTE Positioning Protocol A (LPPa) defined in 3GPP Technical Specification (TS) 36.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355, where LPP messages are transferred inside NAS transport messages between the UE 105 and the LMF 152 via the AMF 154 and a serving gNB 110-1 for UE 105. For example, LPP messages may be transferred between the LMF 152 and the AMF 154 using a 5G Location Services Application Protocol (LCS AP) and may be transferred between the AMF 154 and the UE 105 using a 5G Non-Access Stratum (NAS) protocol. The LPP protocol may be used to support positioning of UE 105 using UE assisted and/or UE based position methods such as A-GNSS, RTK, WLAN, OTDOA and/or ECID. The NRPPa protocol may be used to support positioning of UE 105 using network based position methods such as ECID (when used with measurements obtained by a gNB 110) and/or may be used by LMF 152 to obtain location related information from gNBs 110 such as parameters defining positioning reference signal (PRS) transmission from gNBs 110 for support of OTDOA.

With a UE assisted position method, UE 105 may obtain location measurements (e.g. measurements of RSSI, RTT, RSTD, RSRP and/or RSRQ for gNBs 110, ng-eNBs 114 or WLAN APs, or measurements of GNSS pseudorange, code phase and/or carrier phase for SVs 190) and send the measurements to a location server (e.g. LMF 152) for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 152 or broadcast by gNBs 110, ng-eNBs 114 or other base stations or APs). With a network based position method, one or more base stations (e.g. gNBs 110 and/or ng-eNBs 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GC 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 102 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 is connected to the Location Retrieval Function (LRF) 157, which handles retrieval of location information for the UE 105 and may be used to provide location information for UE 105 to an external client 130 that is a Public Safety Answering Point, e.g. following an emergency call from UE 105 to the PSAP.

To support services including location services from external clients 130 for Internet of Things (IoT) UEs, a Service Capability Exposure Function (SCEF) 159 may be included. The SCEF 159, for example, may function to obtain a current or last known location for a UE 105, may obtain an indication of a change in location for a UE 105, or an indication of when a UE 105 becomes available (or reachable). An external client 130 may access a Services Capability Server (SCS, not shown in FIG. 1), which may access SCEF 159 on behalf of external client 130 in order to provide location information to the external client 130 for UE 105 via the SCS. The SCEF 159 may be connected to the GMLC 155 to support last known location, current location and/or deferred periodic and triggered location for the UE 105. If desired, the SCEF 159 may include, or may be combined with, the GMLC 155 and may then obtain location information for UE 105 directly from LMF 152 (e.g. may be connected to LMF 152). For example, in the procedures described later in association with FIGS. 11-14, SCEF 159 may replace HGMLC 155H or may be combined with HGMLC 155H.

Figure 2:
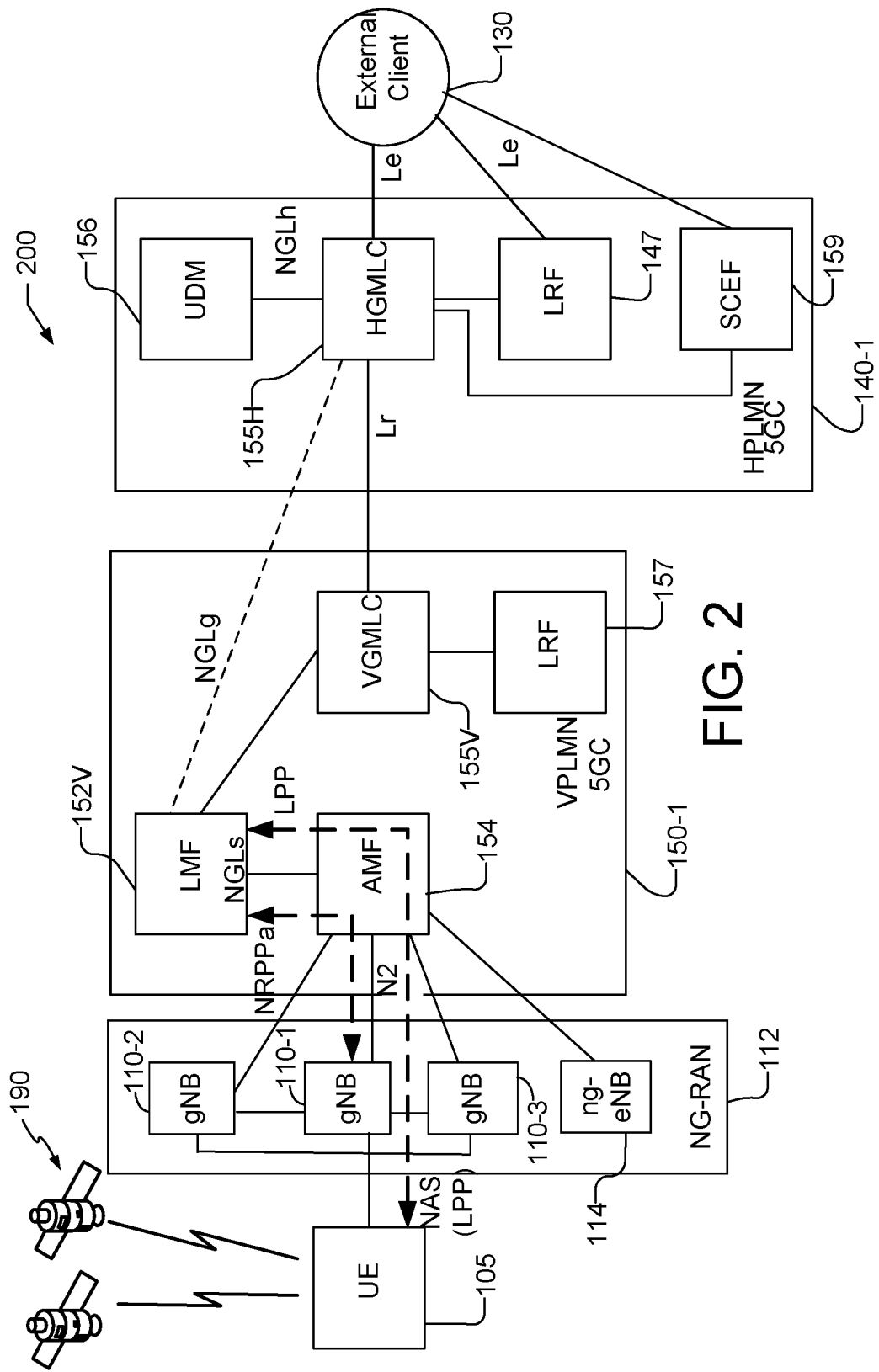
FIG. 2 is a block diagram illustrating a roaming reference architecture for an LMF based CP location solution in a wireless network.

FIG. 2 illustrates a communication system 200 that is similar to the communication system 100 shown in FIG. 1, but supports location for a roaming UE 105. In the communication system 200, the core network 5GC 150-1 that is in communication with the UE 105 via the NG-RAN 112 is a visited network, i.e., Visited Public Land Mobile Network (VPLMN), which is in communication with a home network 5GC, i.e., Home Public Land Mobile Network (HPLMN) 140-1. In communication system 200, the VPLMN 5GC 150-1 includes the Location Management Function (LMF) 152V. Except as discussed below, the LMF 152V performs the same functions and operations as LMF 152 in the non-roaming communication system of FIG. 1, but is designated as LMF 152V to indicate that it is located in a visited network for UE 105. The VPLMN 5GC 150-1 also includes a Visited Gateway Mobile Location Center (VGMLC) 155V, which is similar to the GMLC 155 in the non-roaming communication system of FIG. 1, and is designated as 155V to indicate that it is located in the visited network for UE 105. As illustrated in FIG. 2, the VGMLC 155V connects to the LMF 152V and to the LRF 157 in the VPLMN 5GC 150-1.

As illustrated, HPLMN 5GC 140-1 may include a Home GMLC (HGMLC) 155H that may be connected to the VGMLC 155V (e.g., via the Internet). Optionally (and as shown by the dashed line in FIG. 2), HGMLC 155H may be connected to LMF 152V (e.g. via the Internet) and may in that case not always be connected to VGMLC 155V. The HGMLC 155H may be similar to the GMLC 155 in the non-roaming communication system of FIG. 1, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 and LRF 147 in the HPLMN 140-1. The LRF 147 may also communicate with the external client 130 and may perform similar functions to LRF 157. The HGMLC 155H may provide location access to UE 105 on behalf of external clients such as external client 130. One or more of HGMLC 155H and LRF 147 may be connected to external client 130, e.g., through another network, such as the Internet. In some cases, a Requesting GMLC (RGMLC) located in another PLMN (not shown in FIG. 2) may be connected to HGMLC 155H (e.g., via the Internet) in order to provide location access to UE 105 on behalf of external clients connected to the RGMLC. The RGMLC, HGMLC 155H and VGMLC 155V may support location access to UE 105, at least in part, using the 3GPP CP solution defined in 3GPP TS 23.271. HPLMN 5GC 140-1 also includes SCEF 159 which may correspond to SCEF 159 in communication system 100 and may be connected to HGMLC 155H.

Figure 3:
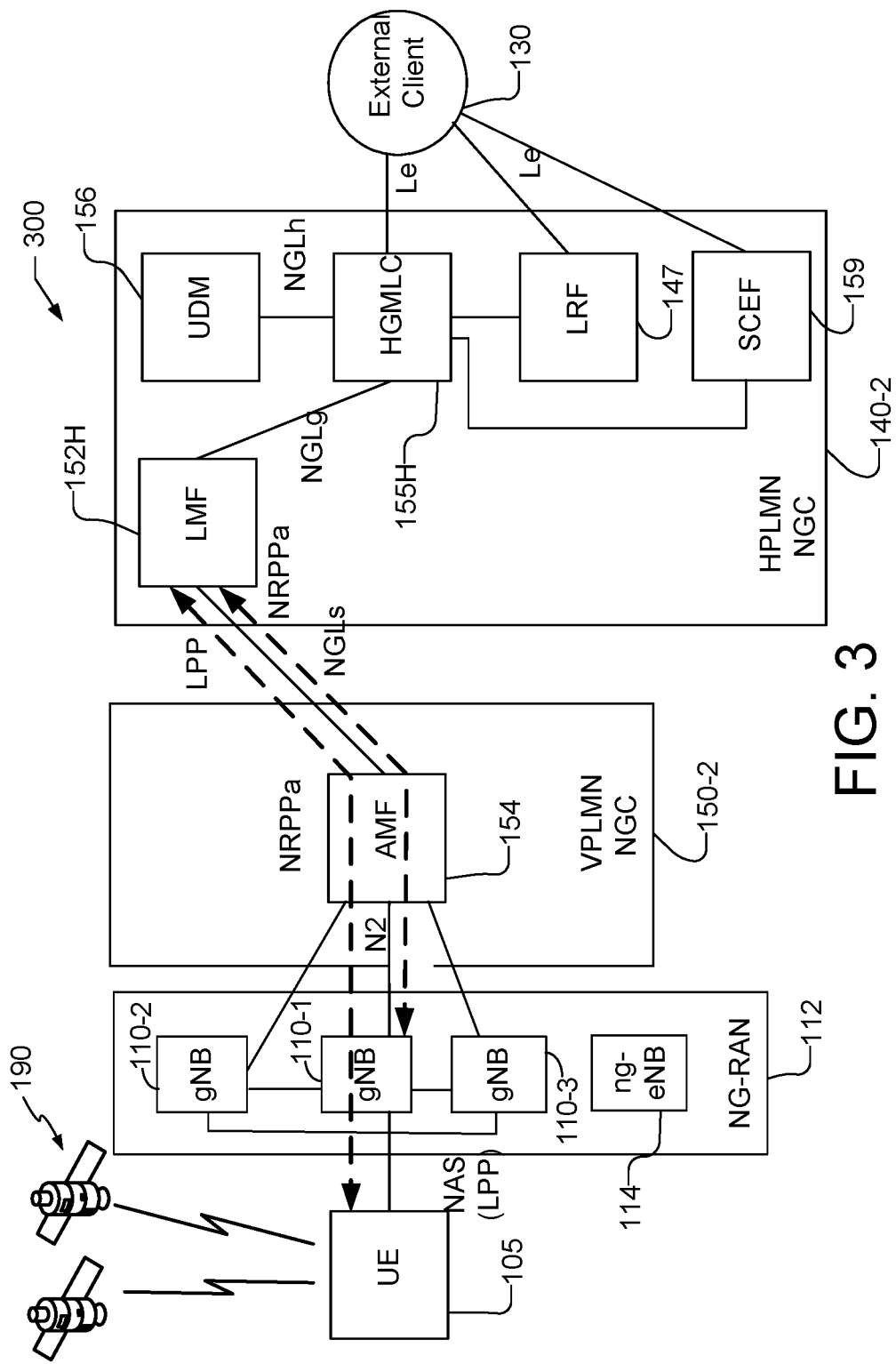
FIG. 3 is a block diagram illustrating another roaming reference architecture for an LMF based control plane (CP) location solution in a wireless network.

FIG. 3 illustrates another communication system 300 that is similar to the communication system 200 shown in FIG. 2 and provides alternative location support for a roaming UE 105. In the communication system 300, however, the LMF 152H is located in the HPLMN 5GC 140-2 as opposed to the VPLMN 5GC 150-2. The LMF 152H may perform the same or similar functions and operations as LMF 152 in the non-roaming communication system 100 of FIG. 1 and LMF 152V in the roaming communication system 200, but is designated as LMF 152H to indicate that it is located in the home network for UE 105. The LMF 152, 152V and 152H may be sometimes collectively and generically referred to herein as LMF 152. As illustrated in FIG. 3, the HGMLC 155H connects to LMF 152H. The LMF 152H also connects to the AMF 154 that is in the VPLMN 5GC 150-2 (e.g. via the Internet). The HGMLC 155H also connects to the UDM 156, the LRF 147 and the SCEF 159 in the HPLMN 140-2 and provides access on behalf of the external client 130.

To assist references to different interfaces and show correspondence to the EPC CP location solution defined in 3GPP TS 23.271, some interfaces in FIGS. 1-3 are labelled as NGLx corresponding to an interface SLx for EPC (e.g. with NGLg corresponding to SLg for EPC). The interfaces labelled as Le, N2, NGLg, NGLs, Lr and NGLh in FIGS. 1-3 may be interfaces that support control plane signaling and may be associated with control plane protocols that are used over one or more of the interfaces to support the control plane signaling. For example, a control plane protocol similar to or the same as the EPC LCS Protocol (ELP) defined in 3GPP TS 29.172 may be used between an LMF 152 and a GMLC 155 over an NGLg interface; a control plane protocol similar to the NAS Protocol defined in 3GPP TS 24.301 may be used between an AMF 154 and a UE 105 and possibly between an LMF 152 and an AMF 154 over an NGLs interface; a CP NG Application Protocol (NGAP) defined 3GPP TS 38.413 may be used between an AMF 154 and a gNB 110 or ng-eNB 114 over an N2 interface; a CP LPP or NPP protocol may be used between a UE 105 and an LMF 152; and a CP supplementary service protocol (SSP, e.g. as defined in 3GPP TS 24.080) may be used between a UE 105 and an LMF 152 (e.g. to support supplementary service signaling as described later for FIGS. 11-14).

As noted, while the communication systems 100, 200, and 300 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GC 150, 150-1 and/or 150-2 may be connected to a WLAN using a Non-3GPP InterWorking Function (N3IWF, not shown FIGS. 1-3) in the 5GC 150. For example, the WLAN may support IEEE 802.11 WiFi access for UE 105. Here, the N3IWF may connect to the WLAN and to other elements in the 5GC 150 such as AMF 154. The 5GC CP location solution described herein may then operate the same as or similarly to that described further down with the difference that an LMF 152 may no longer interact with NG-RAN 112 to obtain location related information for UE 105 and may instead interact with UE 105 by sending and receiving LPP and/or NPP messages with UE 105 via the N3IWF and WLAN.

In other embodiments, the 5GC cores 140-1 and 140-2 (collectively referred to as 5GC 140) and 150, 150-1, 150-2 (collectively referred to as 5GC 150) may be configured to control different air interfaces, such as the Evolved Universal Terrestrial Radio Access Network (E-UTRAN) comprising one or more evolved NodeBs (eNBs) in place of the gNBs 110. In some other embodiments, both the NG-RAN 112 and the 5GC 140, 150 may be replaced by other RANs and other core networks. For example, in an Evolved Packet System (EPS) defined by 3GPP to support LTE access: the UE 105 may access the EPS rather than the NG-RAN 112 and 5GC 140/150; the NG-RAN 112 may be replaced by an E-UTRAN containing eNBs in place of the gNBs 110; and the 5GC 140/150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to the VGMLC 155. In such an EPS, the E-SMLC may use LPPa in place of NRPPa to send and receive location information to and from the eNBs in the E-UTRAN and may use LPP to support positioning of UE 105. In addition, in some implementations, base stations (e g similar to or based on a gNB 110 or ng-eNB 114) may function as positioning only beacons and transmit signals (e.g. PRS) to assist positioning of a UE 105 but not receive signals.

In a traditional type of control plane (CP) location solution for a 5G wireless network, in either a roaming or non-roaming architecture, the AMF 154, as opposed to the LMF 152, may be connected to the GMLC 155. Similarly, the LMF 152 may be connected to the AMF 154 but not to the GMLC 155. Since the AMF 154 may be connected to both the LMF 152 and GMLC 155, the AMF 154 may serve as the main anchor point for location of the UE 105 as observed previously. Accordingly, a traditional CP location solution for a 5G network may be referred to as an AMF solution, an AMF based solution, a traditional AMF solution, or as an AMF-LMF solution.

With the 5GC CP location solution exemplified in FIGS. 1-3, the AMF 154 may only be connected to the LMF 152 but not to the GMLC 155. However, the LMF 152 is connected to both the AMF 154 and the GMLC 155. Therefore, the LMF 152 may serve as the main anchor point for location of the UE 105 and the 5GC CP location solution may be referred to as an LMF based solution as observed previously. Although the LMF based solution differs architecturally from the traditional AMF (or AMF-LMF) solution, and from the traditional CP solution for LTE access defined in 3GPP TS 23.271, some of the same protocols may be used. For example, in the case of the NGLg interface (between a GMLC 155 and an LMF 152) for the LMF based solution, a protocol the same as or very similar to the EPC Location Protocol (ELP) defined in 3GPP TS 29.172 could be used to reduce impacts to a GMLC 155 in the case that the GMLC 155 is implemented based on a GMLC implementation for the traditional CP solution for LTE access. Similarly, the protocol used for the NGLg interface for the LMF based solution could be very similar or the same as a protocol used between the GMLC 155 and the AMF 154 for the traditional AMF solution for a 5G network, were both the LMF based solution and the traditional AMF solution to be defined by 3GPP for a 5G network. In addition, use and support of LPP/NPP and NRPPa positioning protocols for the LMF based solution could be the same as or similar to use and support of LPP/NPP and NRPPa positioning protocols for the traditional AMF solution, were both solutions to be defined by 3GPP.

The use of the AMF solution, however, may suffer from several undesirable restrictions and limitations. For example, one limitation may be that the AMF is used as an anchor point for location support and is required to maintain state information for location sessions. Consequently, a location session for a UE 105 may need to be aborted following any inter-AMF handover or inter-AMF cell change for the UE 105. Moreover, using the AMF as an anchor point for location support and requiring that it maintain state information may present a significant impact to the AMF in terms of resource usage (e.g. processing and signaling) and/or implementation. Another limitation may be that some of the CP interfaces used by the AMF based solution may not be capable of being removed by combining entities that perform similar functions (e.g. such as combining the LMF 152 and a GMLC 155 in the same 5GC). Combining entities could reduce complexity, but may not be possible with traditional CP location solutions. Additionally, in a traditional CP location solution for a 5G network, location access from the HPLMN (e.g. HPLMN EPC 140) may require VPLMN (e.g. VPLMN EPC 150) support for an LMF (e.g. LMF 152V). Consequently, customized HPLMN support for location (e.g. based on special requirements for a UE 105 or external client 130) may be limited, since the LMF 152V that is used to locate a UE 105 is in the VPLMN and not under the control of the HPLMN. Further, support of periodic or triggered location of a UE 105 may require the UE 105 and an AMF 154 to support supplementary services signaling and procedures (e.g. to enable a Mobile Originated Location Request (MO-LR) to be used by a UE 105 to report periodic or triggered locations as defined for LTE access in 3GPP TS 23.271), which may add additional complexity to the UE 105 and AMF 154.

As illustrated in FIG. 1 for non-roaming scenarios and in FIGS. 2 and 3 for roaming scenarios, the 5GC CP location architectures differ from the traditional CP location solution in that the LMF 152 serves as the main anchor point for location rather than the AMF 154. One advantage of this is that a location session for a UE 105 may not need to be aborted following an inter-AMF handover or inter-AMF cell change for the UE 105 because the same LMF 152 may be used for location of the UE 105 both before and after the handover or cell change and may thus continue to support the location session. In addition, since the AMF 154 is no longer an anchor point for location support, state information in the AMF 154 may not be needed and resource usage (e.g. processing and signaling) and/or implementation impacts may be reduced. As another advantage, an LMF 152 may be combined with a GMLC 155 in the same 5GC to reduce complexity—e.g. by avoiding a need to support an NGLg interface. Additionally, the LMF 152H can be in the HPLMN EPC 140 in the case of a roaming UE 105, as illustrated in FIG. 3, if an external client 130 accesses the HPLMN EPC 140 rather than the VPLMN EPC 150. This may have several advantages including allowing location support in the HPLMN EPC 150 more customized to a UE 105 and/or external client 130 subscription requirements and avoiding the need to support the Lr interface between HGMLC 155H and VGMLC 155V. However, when an external client 130 accesses the VPLMN EPC 150 (e.g. for location of an emergency call), the LMF 152V in the VPLMN EPC 150 can be used, as illustrated in FIG. 2. Further, support of periodic or triggered location of a UE 105 may not require the UE 105 and an AMF 154 to support supplementary services signaling and procedures (e.g. an MO-LR), which may reduce complexity to the UE 105 and AMF 154. These various advantages of the 5GC CP location solution are illustrated in exemplary message flows for the 5GC CP location solution described below with reference to FIGS. 4-14. Unless stated otherwise below, the exemplary procedures and techniques below may be assumed to apply to the 5GC (LMF based) location solution in one or more of the communication systems 100, 200 and 300.

Figure 4:
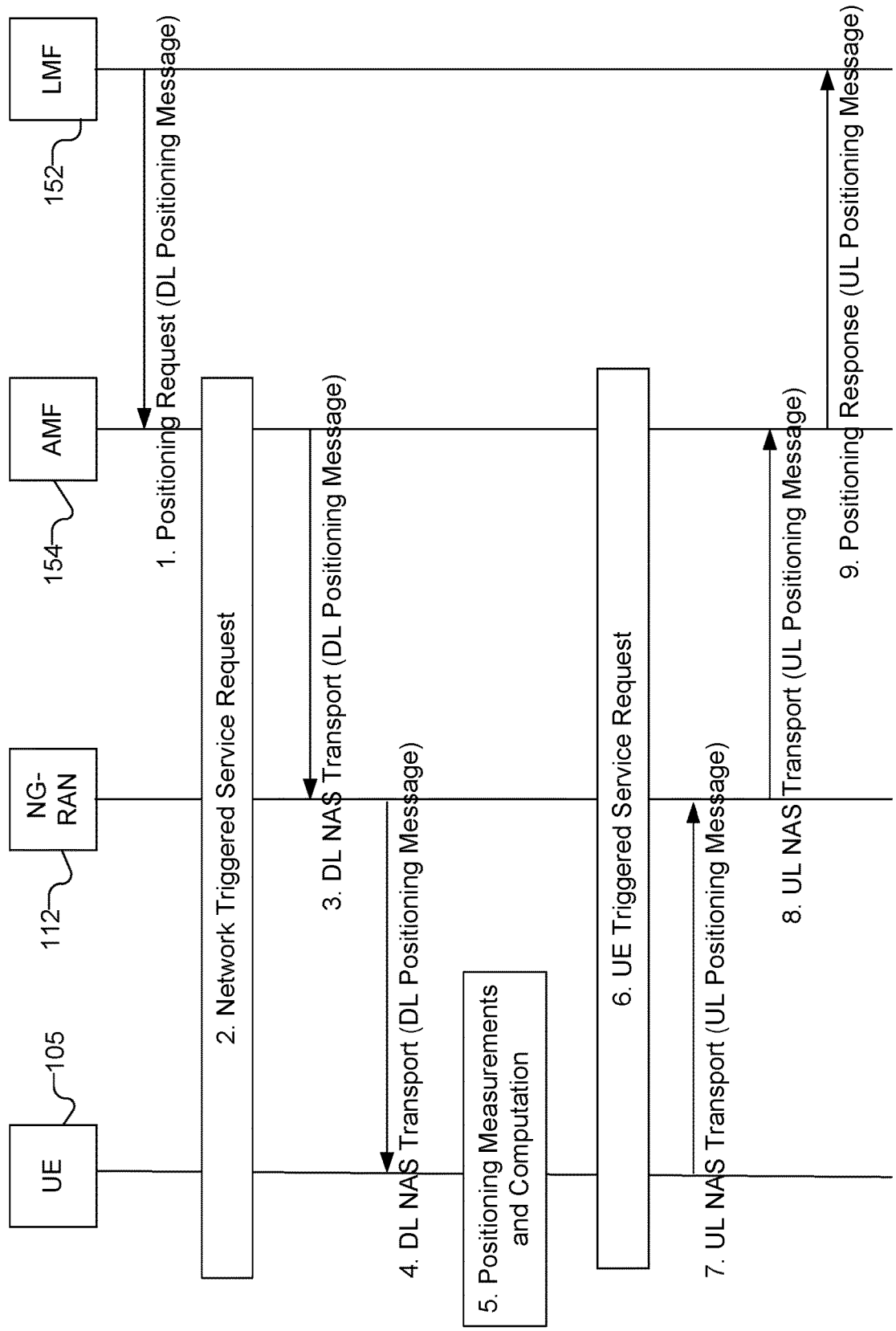
FIG. 4 is a message flow illustrating a downlink positioning procedure that can be used to support user equipment (UE) assisted and UE based position methods.

FIG. 4 shows a downlink positioning procedure that can be used to support UE assisted and UE based position methods (e.g. A-GNSS, OTDOA, ECID). A precondition for the downlink positioning procedure in FIG. 4 may be that a UE identifier (ID) for UE 105 has been passed to the LMF 152. The UE identifier may be a global identifier or may be a local identifier assigned by the AMF 154. A global identifier may comprise an International Mobile Subscriber Identity (IMSI), a Mobile Station International Subscriber Directory Number (MSISDN), an International Mobile Equipment Identity (IMEI), a Subscription Permanent Identifier (SUPI) or a Permanent Equipment Identifier (PEI). The UE identifier may be passed, for example, to LMF 152 by AMF 154 when AMF 154 informs LMF 152 of an emergency call for UE 105. The UE identifier may also be passed to LMF 152 by a GMLC 155 when the GMLC 155 requests a location for UE 105 from LMF 152. It is noted that the terms "identity", "identifier", "ID" and (except for the UE 105) "address" are regarded here as synonymous and are used interchangeably.

At stage 1 in FIG. 4, the LMF 152 sends a Positioning Request message to the AMF 154 carrying a Downlink (DL) Positioning message (e.g. an LPP or NPP message) and the UE identifier, e.g., a local UE ID or a global UE ID. The DL Positioning message may request location information from the UE 105, provide assistance data to the UE 105 or query for the UE 105 capabilities.

At stage 2 in FIG. 4, if the UE 105 is in an IDLE state, the AMF 154 performs a network triggered service request (e.g. as defined in 3GPP TS 23.502) to establish a signaling connection with the UE 105. Thus, the AMF 154 may page the UE 105 to establish a signaling connection to the UE 105 prior to forwarding any LPP or NPP message to UE 105 via the NG-RAN 112.

At stage 3, the AMF 154 forwards the Downlink Positioning message to the NG-RAN 112 (e.g., to the serving gNB 110-1 for the UE 105) in a DL NAS Transport message. The AMF 154 includes a Routing identifier, in the DL NAS transport message, identifying the LMF 152 (e.g. a global or local address of the LMF 152).

At stage 4, the serving base station in the NG-RAN 112 (e.g. gNB 110-1) forwards the DL NAS Transport message containing the Downlink Positioning message and Routing identifier to the UE 105.

At stage 5, the UE 105 stores any assistance data provided in the Downlink Positioning message and performs any positioning measurements and location computation requested by the Downlink Positioning message.

At stage 6, if the UE 105 is in an IDLE state, the UE 105 instigates a UE triggered service (e.g. as defined in 3GPP TS 23.502) in order to establish a signaling connection with the AMF 154.

At stage 7, the UE 105 returns any location information obtained at stage 5 or returns any capabilities requested at stage 4 to the serving base station (e.g. gNB 110-1) in an Uplink (UL) Positioning message (e.g. an LPP or NPP message) included in an UL NAS Transport message. The Uplink Positioning message may alternatively carry a request for further assistance data. The UE 105 also includes the Routing identifier in the UL NAS Transport message received at stage 4. By including the Routing identifier with any UL NAS Transport message returned to the AMF 154, the AMF 154 is able to forward the UL NAS Transport message to the LMF 152 without retaining any state information for the query.

At stage 8, the serving base station in the NG-RAN 112 (e.g. gNB 110-1) forwards the Uplink Positioning message and Routing identifier to the AMF 154 in the UL NAS Transport message.

At stage 9, the AMF 154 forwards the Uplink Positioning message to the LMF 152 indicated by the Routing identifier in a Positioning Response and includes a UE identifier for UE 105. Stages 6 to 9 may be repeated if the UE 105 needs to send multiple messages to LMF 152 to respond to the request received at stage 4. Stages 1 to 9 may be repeated by LMF 152 to send new assistance data to UE 105, and/or to request further location information and further UE 105 capabilities from UE 105.

Figure 5:
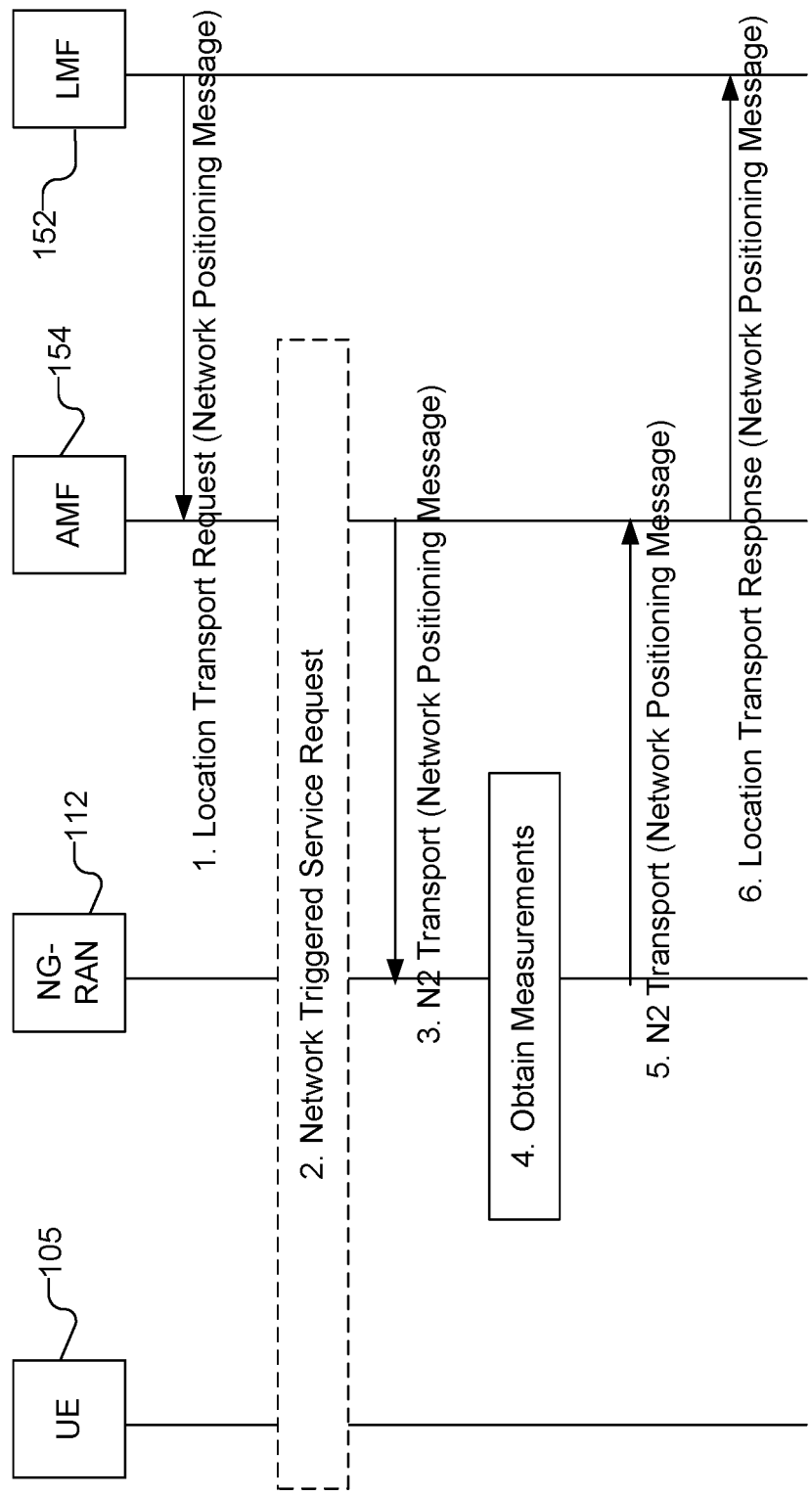
FIG. 5 is a message flow illustrating an uplink positioning procedure that can be used to support network assisted and network based positioning.

FIG. 5 shows a procedure for a query for uplink positioning information that may be used by an LMF 152 to support network based positioning. A precondition for the procedure in FIG. 5 may be that a UE identifier (ID) for UE 105 has been passed to the LMF 152 as described previously for FIG. 4.

At stage 1 in FIG. 5, the LMF 152 uses a transport protocol to send a transport message (e.g. a location transport request) to the AMF 154 requesting that a Network Positioning message (e.g. an NRPPa message) be sent to the serving base station (e.g. gNB 110-1 or ng-eNB 114) for UE 105 within the NG-RAN 112. The transport message includes the Network Positioning message and the UE identifier. The Network Positioning message may request location information for the UE 105 from the NG-RAN 112 (e.g. from a serving gNB 110-1 or serving ng-eNB 114 for UE 105)

At stage 2 in FIG. 5, if the UE 105 is in an IDLE state, the AMF 154 initiates a network triggered Service Request procedure (e.g. as defined in 3GPP TS 23.502), to establish a signaling connection with the UE 105. Thus, the AMF 154 may page the UE 105 to establish a signaling connection to the UE 105 prior to forwarding any NRPPa message to the NG RAN 112.

At stage 3, the AMF 154 forwards the Network Positioning message, (e.g., an NRPPa message) to the NG RAN 112 (e.g. to the serving gNB 110-1 or serving ng-eNB 114 for the UE 105) in a transport message (e.g. an N2 Transport message). The AMF 154 includes a routing identifier, in the transport message, identifying the LMF 152 (e.g. a global or local address of the LMF 152).

At stage 4, the NG RAN 112 (e.g. the serving gNB 110-1 or ng-eNB 114 for the UE 105) obtains any location information (e.g. measurements of RSSI, RSRP, RSRQ and/or TOA) for the UE 105 requested at stage 3.

At stage 5, the NG RAN 112 (e.g. the serving gNB 110-1 or ng-eNB 114 for the UE 105) returns any location information obtained at stage 4 to the AMF 154 in a Network Positioning message (e.g., an NRPPa message) included in a transport message (e.g. an N2 Transport message). The NG RAN 112 also includes the routing identifier received at stage 3 in the transport message.

At stage 6, the AMF 154 uses a transport protocol to send a transport message (e.g. a location transport response) to the LMF 152 indicated by the routing identifier received at stage 5. The transport message includes the Network Positioning message received at stage 5 and a UE identifier. Stages 1 to 6 may be repeated by LMF 152 to request further location information for UE 105 and/or capabilities from NG-RAN 112.

Figure 6:
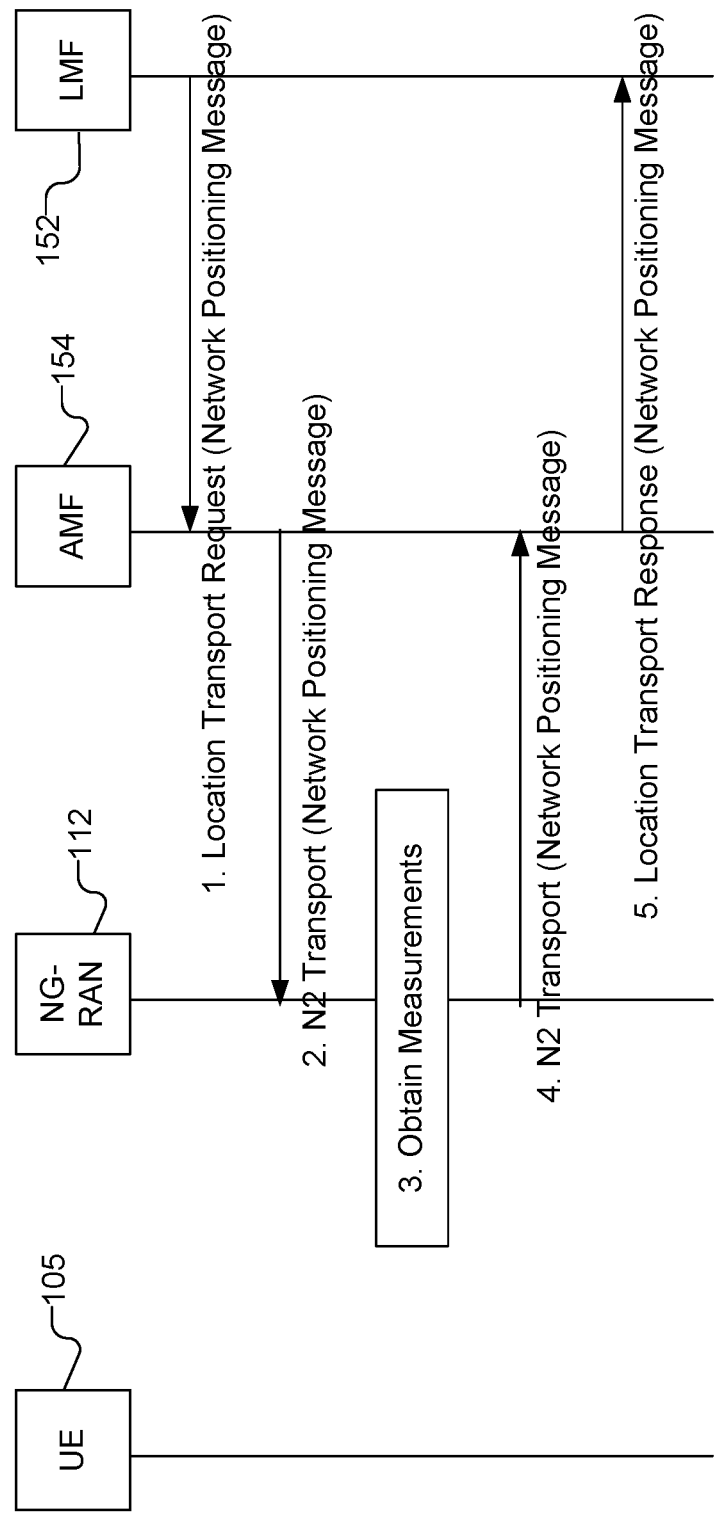
FIG. 6 is a message flow illustrating a network based procedure that can be used to support network and UE position methods.

FIG. 6 shows a procedure for a query for non-UE associated network assistance data which may be used by an LMF 152 to help support UE assisted, UE based and/or network based positioning. This procedure may not be associated with a UE location session. It may be used instead by LMF 152 to obtain network assistance data from a base station (e.g. gNB 110 or ng-eNB 114), which may be used at a later time by LMF 152 to help compute a location for a UE 105 and/or may be sent to a UE 105 as assistance data to assist location measurements and possibly location computation by UE 105.

At stage 1 in FIG. 6, the LMF 152 uses a transport protocol to send a transport message (e.g. a location transport request) to the AMF 154 to request the transfer of a Network Positioning message (e.g. an NRPPa message) to a target base station (e.g. a gNB 110 or ng-eNB 114) within the NG-RAN 112. The transport message includes the Network Positioning message and the target base station identity. The Network Positioning message may request position related information from the NG-RAN 112 (e.g. from a gNB 110 or ng-eNB 114) such as location coordinates for the target base station and/or signal characteristics for the target base station. In some cases, the target base station may be identified as a serving base station for a particular UE 105 by including a local or global UE ID in the transport message, which may be useful when the LMF 152 is in the HPLMN 140 (e.g. as in communication system 300) and does not have information on individual base station identities for the NG RAN 112 in the VPLMN 150.

At stage 2 in FIG. 6, the AMF 154 forwards the Network Positioning message (e.g., the NRPPa message) to the target base station in the NG-RAN 112 indicated at stage 1 in a transport (e.g. N2 Transport) message. The AMF 154 includes a routing identifier, in the transport message, identifying the LMF 152 (e.g. a global address of the LMF 152).

At stage 3, the target base station in the NG-RAN 112 (e.g. a gNB 110 or ng-eNB 114) obtains any position related information requested at stage 2. For example, the position related information may be, e.g., information regarding timing and signaling from one or more NG-RAN 112 base stations or cells and/or location coordinates for one or more NG-RAN 112 base station antennas.

At stage 4, the target base station in the NG-RAN 112 returns any position related information obtained at stage 3 to the AMF 154 in a Network Positioning message (e.g. an NRPPa message) included in a transport (e.g. N2 Transport) message. The target base station also includes the routing identifier received at stage 2 in the transport message.

At stage 5, the AMF 154 uses a transport protocol to send a transport message (e.g. a location transport response) to the LMF 152 indicated by the routing identifier received at stage 4. The transport message includes the Network Positioning message received at stage 4 and a UE identifier. Stages 1 to 5 may be repeated by LMF 152 to request further position related information from the NG-RAN 112.

Figure 7:
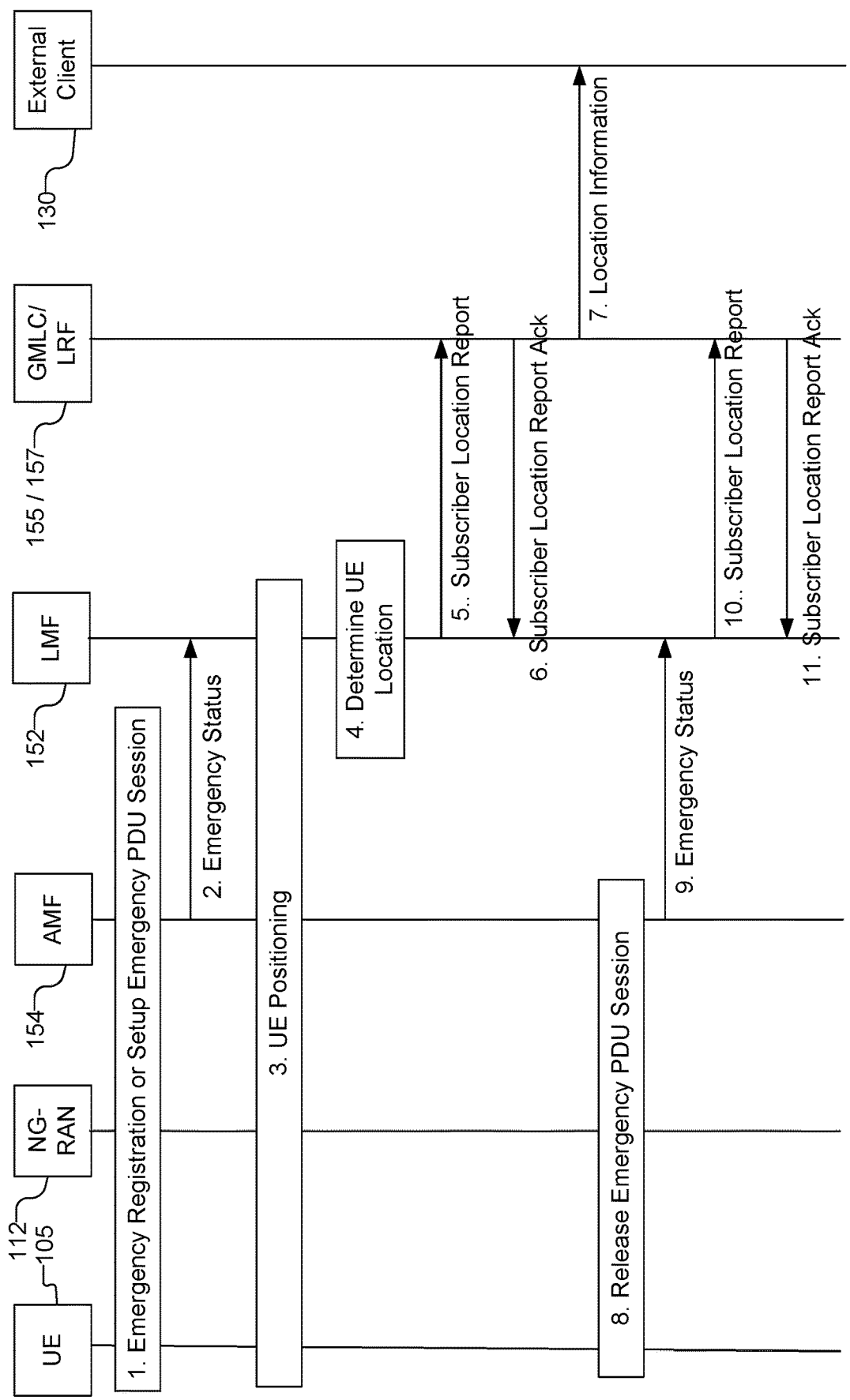
FIG. 7 is a message flow illustrating a Network Induced Location Request (NI-LR) procedure for a roaming or non-roaming UE where the UE initiates an emergency call.

FIG. 7 shows a Network Induced Location Request (NI-LR) procedure for a roaming or non-roaming UE 105 in the case where the UE 105 initiates an emergency call. The procedure assumes that the serving AMF 154 is aware of the emergency call initiation by UE 105, e.g., due to supporting an emergency registration procedure for the UE 105 or assisting in establishing an emergency Protocol Data Unit (PDU) session for the UE 105.

At stage 1 in FIG. 7, the UE 105 registers with the AMF 154 for emergency services and/or requests the establishment of an emergency PDU session (e.g. comprising an emergency bearer) with the 5GC 150 via the AMF 154. The AMF 154 may thereby infer that UE 105 is instigating an emergency call.

At stage 2, and based on the emergency call detection at stage 1, the AMF 154 selects an LMF 152 in the VPLMN 150 (e.g. based on LMF 152 support for emergency services or based on the serving cell ID for the UE 105) and sends an event notification, which may comprise an emergency status message, to the LMF 152 indicating an emergency call initiation by UE 105. The AMF 154 also includes a global identity (ID) for the UE 105 (e.g. an IMSI, MSISDN, IMEI, SUPI or PEI), the current serving cell ID, and may include a local UE ID for the UE 105 assigned by the AMF 154. If an immediate location of the UE 105 is not needed, the LMF 152 skips stages 3 and 4 and proceeds to stage 5.

At stage 3, the LMF 152 may transfer assistance data to the UE 105 and/or obtain location information from the UE 105 and/or from NG-RAN 112 as described in FIGS. 4-6.

At stage 4, the LMF 152 determines (e.g. calculates) a location estimate for the UE 105 based on information obtained at stages 2 and 3. It is noted that because the same LMF 152 can continue to be used to support further location requests for the same UE 105 during an emergency call (e.g. see FIGS. 8, 9 and 10), the LMF 152 could cache positioning information for the UE 105 to assist future location requests such as according to FIG. 8.

At stage 5, the LMF 152 determines a GMLC 155 in the same PLMN as the LMF 152. Thus, if the UE 105 is roaming, the GMLC 155 may correspond to VGMLC 155V in communication system 200. The determination of GMLC 155 by LMF 152 may be based on the serving cell identity for UE 105 or the location determined at stage 4 or may be based on some fixed association of GMLC 155 with the AMF 154 or with LMF 152. The LMF 152 sends an indication of an emergency call for UE 105 to VGMLC 155 and includes the global identity of the UE 105 received at stage 2, the identity of the LMF 152 and the UE location if obtained at stage 4. Stage 5 (and stage 6) can be omitted if the LMF 152 and GMLC 155 functions are combined in the same entity. It is noted that the GMLC 155 would typically update an LRF 157 with the information received at stage 5 to allow the LRF 157 to request the location of the UE 105 using an MT-LR at a later time as described further down for FIG. 8.

At stage 6, the VGMLC 155 may return an acknowledgment to the LMF 152.

At stage 7, the GMLC 155 or LRF 157 forwards the location of UE 105, if received at stage 5, to an external emergency services client 130 or may wait for a request for the location of UE 105 from the external emergency services client 130 (not shown in FIG. 7) before forwarding the location (if obtained at stage 5).

At stage 8, the emergency services call and emergency PDU session are released (e.g. by the UE 105 and/or by the 5GC 150)

At stage 9, the AMF 154 sends an event notification, which may comprise an emergency status message, to the LMF 152 indicating an emergency call release for UE 105 and includes the global identity of the UE 105. The LMF 152 then releases any local resources associated with the emergency call for the UE 105.

At stage 10, the LMF 152 sends an indication to the GMLC 155 that the emergency call for UE 105 was released to enable the GMLC 155 and LRF 157 to release any resources associated with the emergency call for UE 105. Stage 10 (and 11) can be omitted if the LMF 152 and GMLC 155 functions are combined in the same entity.

At stage 11, the GMLC 155 returns an acknowledgment to the LMF 152.

Figure 8:
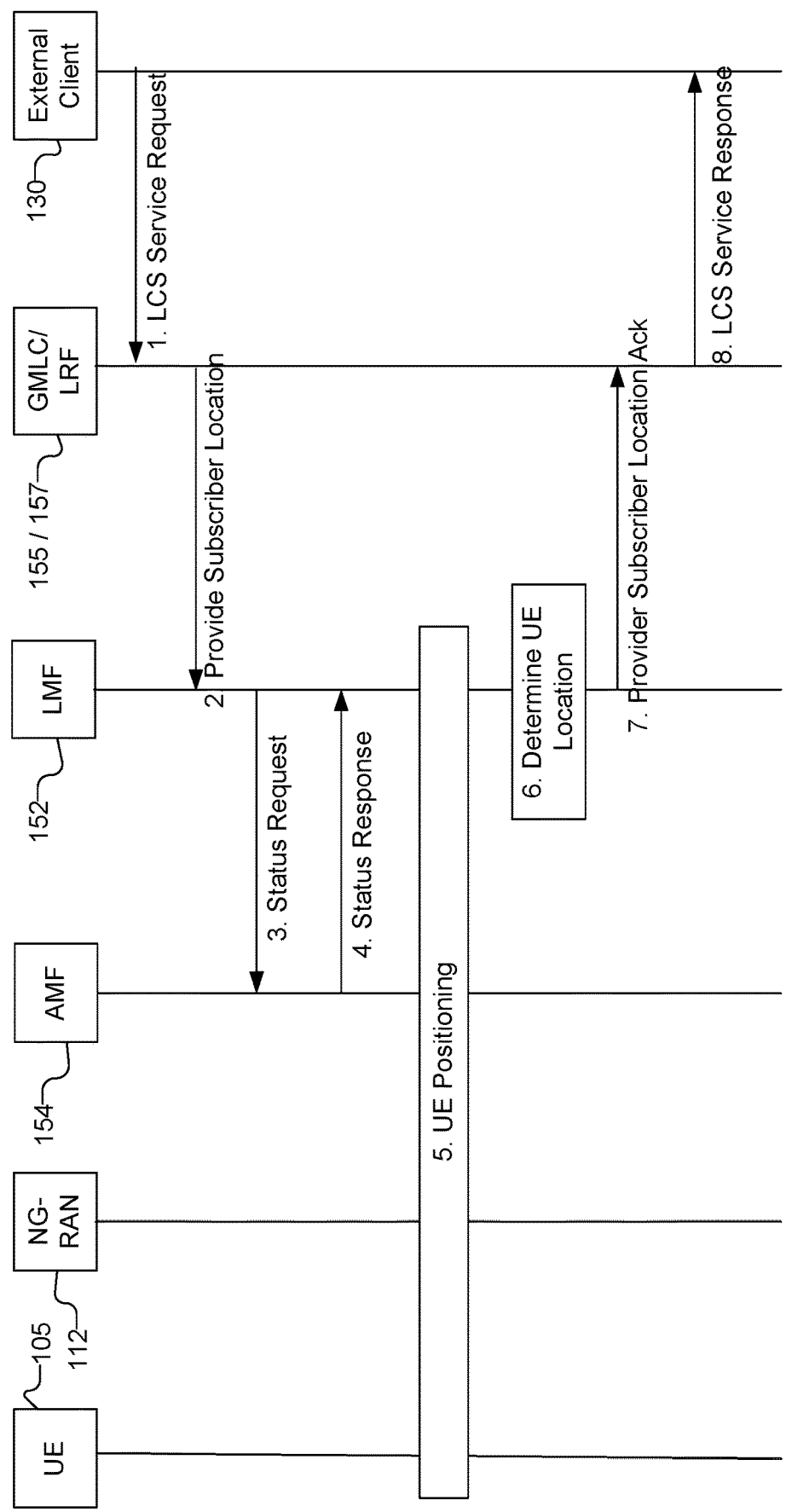
FIG. 8 is a message flow illustrating a location procedure for an emergency services call.

FIG. 8 illustrates a Mobile Terminated Location Request (MT-LR) for an emergency services call for a UE 105 to an external emergency services client 130 (e.g. a Public Safety Answering Point). The external client 130 may identify the target UE 105 and the serving LRF 157 using correlation information that was previously provided to the external client 130 as part of the establishment of the emergency call. The signaling used to provide the correlation information to the external cent 130 may be as defined in 3GPP TS 23.167 (3GPP TS 23.167, "IP Multimedia Subsystem (IMS) emergency sessions"). The correlation information may include an identifier (ID) for UE 105 or an identifier for the emergency call which may be passed to LRF 157 by the external client 130 when requesting a location for UE 105. The correlation information (e.g. the identifier) may be used by LRF 157 to retrieve other information for UE 105 previously provided to LRF 157 by GMLC 155 as described for FIG. 7. This may allow LRF 157 or GMLC 155 to determine LMF 152 without needing to select an LMF or query the home UDM 156 of the target UE 105 for the address of the serving AMF 154. The procedure in FIG. 8 may therefore support location of emergency calls for a roaming UE 105, a UE 105 with no universal integrated-circuit card (UICC), or a UE 105 that is not able to receive normal service in 5GC 150.

At stage 1 in FIG. 8, the external emergency services client 130 (e.g. a PSAP) sends a request to the LRF 157 for a location for the target UE 105 and includes correlation information identifying the target UE 105 or the emergency call. The LRF 157 address and the correlation information would have been previously provided to the external client 130 when the emergency call from the UE 105 was established.

At stage 2, the GMLC/LRF 155/157 determines the LMF 152 by associating the correlation information received from the external client 130 with other information received previously from the LMF 152 as in FIG. 7. The GMLC 155 sends a request (e.g. a Provide Subscriber Location message) to the LMF 152 which carries, if available, a global ID for the target UE 105 (e.g. an IMSI, MSISDN, IMEI, SUPI or PEI), as well as a required location Quality of Service (QoS) such as a required location accuracy and response time, and an indication of a location request from an emergency services client. The LMF 152 identifies the target UE 105 using the global ID. In case of an emergency call for a UICC-less UE 105, the global ID may be a PEI or IMEI.

Figure 9:
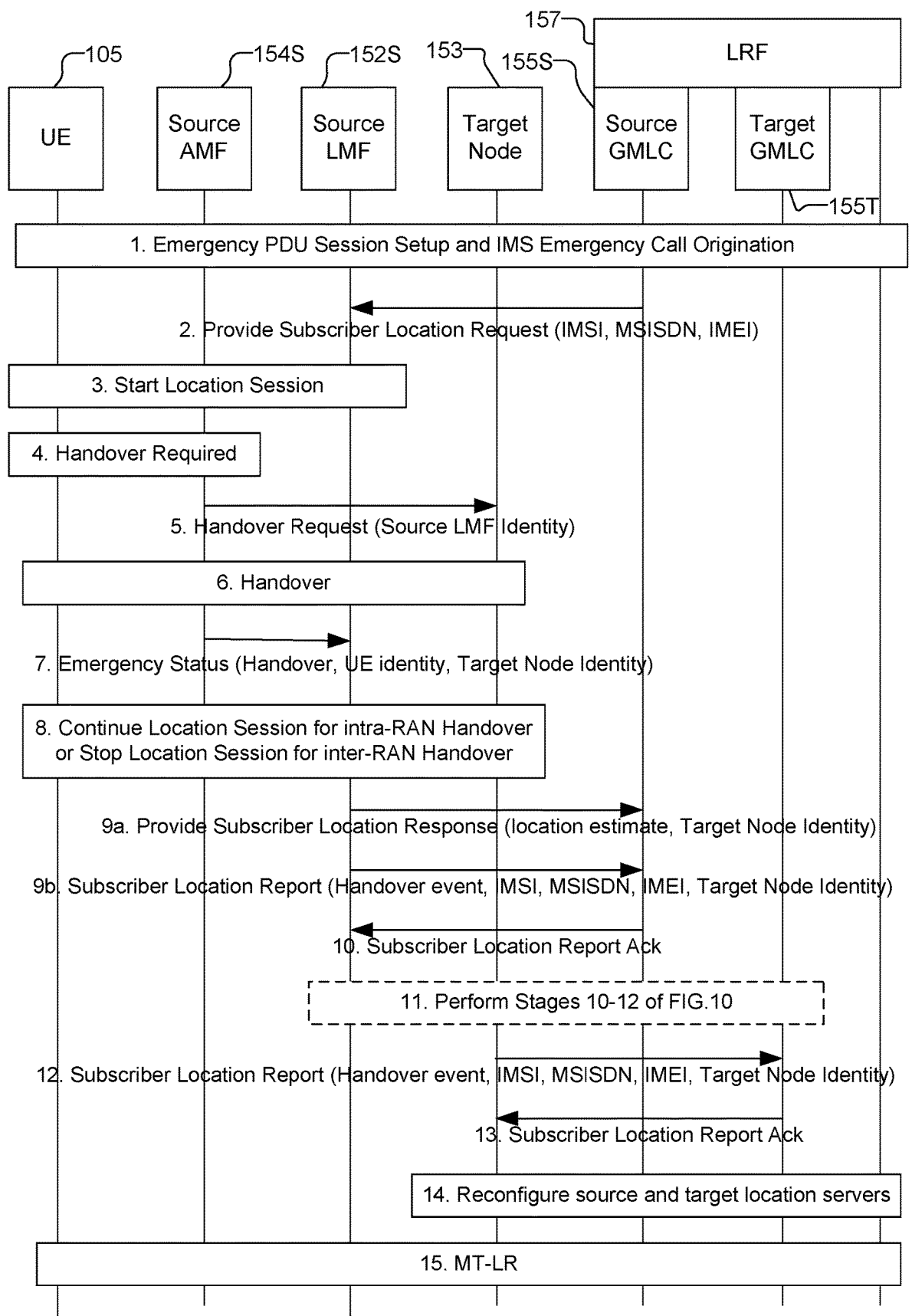
FIGS. 9 and 10 are message flows illustrating support for location continuity following handover of an emergency call.
Figure 10:
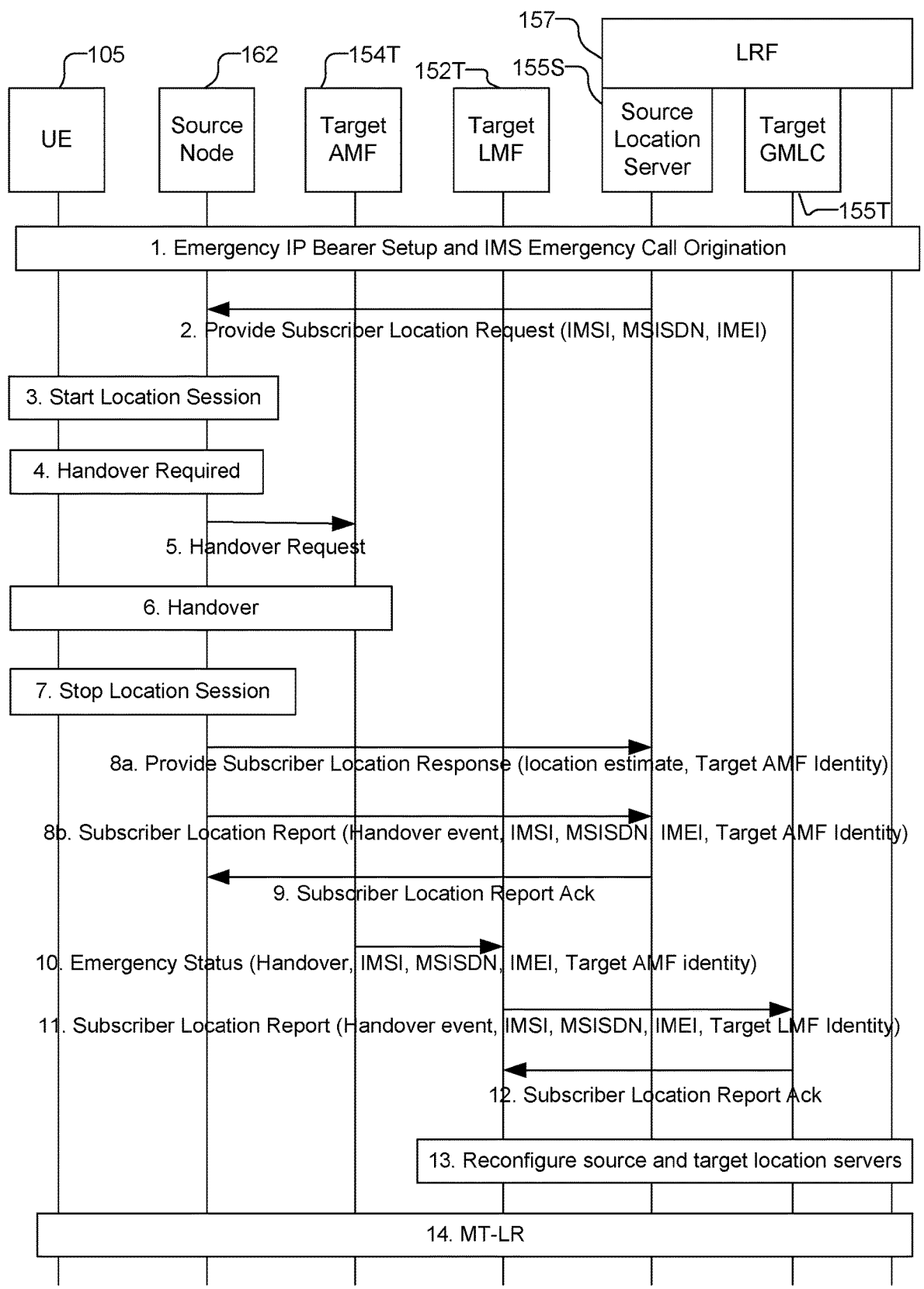

At stage 3, the LMF 152 determines the serving AMF 154 for the UE 15 from information previously received from the AMF 154—e.g. as described for FIG. 7 for an NI-LR for emergency call origination or as described further down for FIGS. 9 and 10 for emergency call handover, The LMF 152 then sends a Status Request to the serving AMF 154 and includes a global or local identity for the target UE 105. The AMF 154 address and the global or local UE identity would have been obtained by the LMF 152 from the AMF 154—e.g. as part of the NI-LR procedure in FIG. 7.

At stage 4, the AMF 154 returns status information for the target UE 105 including the current or last known serving cell ID for UE 105.

At stage 5, the LMF 152 may transfer assistance data to the UE 105 and/or obtains location information from the UE 105 and/or from the NG-RAN 112 as described for FIGS. 4-6.

At stage 6, the LMF 152 determines (e.g. calculates) a location estimate for the UE 105 based on information obtained at stages 4 and 5.

At stage 7, the LMF 152 returns the location information, including possibly its age and obtained accuracy indication to the GMLC/LRF 155/157. The information about the positioning method used may also be sent with the location information.

At stage 8, the LRF 157 sends a location service response to the external emergency services client 130. It is noted that the LMF 152 determined by the GMLC/LRF 155/157 at stage 2 is the LMF associated with the current serving AMF 154 for the UE 105. In the event of handover to a new AMF, this may require updating of the GMLC 155 using the handover procedure described below for FIGS. 9 and 10.

FIG. 9 shows support for location continuity for handover of an IP Multimedia Subsystem (IMS) emergency call for UE 105 from NG-RAN 112 on the source side to either NG-RAN 112 or another 3GPP RAN (e.g. E-UTRAN) on the target side. The procedure in FIG. 9 applies when control plane location according to FIGS. 7 and 8 is used for location of the UE 105 on the source side. The procedure is similar to procedures for location continuity defined in 3GPP TS 23.271 (3GPP TS 23.271, "Functional stage 2 description of Location Services (LCS)") and may have little extra impact on network nodes for 2G, 3G and 4G networks such as an MME or GMLC in an EPC in terms of new signaling. It is noted that if user plane (SUPL) location (OMA-TS-ULP-V2_0_3, "UserPlane Location Protocol" is used on the source (NG-RAN 112) side, then the procedure for location continuity in 3GPP TS 23.271 (3GPP TS 23.271, "Functional stage 2 description of Location Services (LCS)") could be used.

At stage 1 in FIG. 9, following the request for an emergency call, the UE 105 establishes an emergency PDU session (e.g. an emergency IP bearer) and an IMS emergency call to an external emergency services client 130 (not shown in FIG. 9), during which an LRF 157 is assigned in the serving network (e.g. 5GC 150) IMS and a source GMLC 155S may be chosen. The NI-LR procedure of FIG. 7 is also performed which assigns a source LMF 152S and provides the source LMF 152S identity to the GMLC 155S and LRF 157 and optionally an initial location for the UE 105.

At stage 2, at some later time, the LRF 157 may need the UE 105 location (e.g. an updated or initial location) and requests the source GMLC 155S to send a request to the source LMF 152S for the current UE 105 location. The request includes the identity of the UE 105 (e.g. IMSI, MSISDN, IMEI, SUPI or PEI).

At stage 3, if stage 2 occurs, the source LMF 152S starts a location session to obtain the location of the UE 105 as described for stages 3-6 in FIG. 8.

At stage 4, the source AMF 154S receives a request to handover the UE 105 to a cell or base station associated with a different target node 153 which may be another AMF 154T (not shown in FIG. 9) for handover within NG-RAN 112 (e.g. for handover to a different gNB 110 or ng-eNB 114) or a different type of node (e.g. an MME) for inter-RAN handover.

At stage 5, the source AMF 154S sends a handover request to the target node 153. In the case of handover to another AMF 154T (for intra-RAN handover), the source AMF 154S may include the source LMF 152S identity in the handover request if the source LMF 152S will continue to function as the target LMF. This may ensure that in the case of a further handover, the target AMF 154T will be able to update the source LMF 152S with a further handover indication as at stage 7. It is noted that a source LMF 152S continuing to function as the target LMF may require that the source LMF 152S is able to access the target AMF 154T and is configured for location support in the geographic service area for the target AMF 154T. The suitability of a source LMF 152S to function as a target LMF for different target AMFs may be configured in the source AMF 154S. Such configuration may be avoided, however, if all LMFs can serve as a target LMF for all AMFs in 5GC 150 or if the source LMF 152S is always assumed to change to a different target LMF following handover.

At stage 6, the rest of the handover procedure is completed.

At stage 7, after handover is complete, the source AMF 154S sends an event notification (e.g. an emergency status message) to the source LMF 152S indicating handover of the emergency call and including an identity for the UE 105 (e.g. IMSI, MSISDN, IMEI, SUPI, PEI or a local ID), the identity of the target node 153 and whether the source LMF 152S will continue to function as the target LMF in the case of intra-RAN handover to a target AMF 154T.

At stage 8, any location session started at stage 3 may terminate normally before stage 7. If not, the source LMF 152S continues the location session if the target node 153 is an AMF (i.e. for intra-RAN handover) and if the source LMF 152S will continue to function as the target LMF. Otherwise, for an inter-RAN handover (e.g. to E-UTRAN) or where the source LMF 152S will not function as the target LMF, the source LMF 152S aborts the location session and may determine a location estimate for the UE 105 based on any information so far obtained from the source AMF 154S, NG-RAN 112 and/or UE 105.

At stage 9a, if stage 3 has occurred, the source LMF 152S returns a response (e.g. a Provide Subscriber Location response) to the source GMLC 155S once the location session is terminated or (e.g. for inter-RAN handover) is aborted and carrying any location estimate obtained for the UE 105. For inter-RAN handover (e.g. to E-UTRAN), the response also includes the identity of the target node 153. For intra-RAN handover where the source LMF 152S will continue to function as the target LMF, the source LMF 152S does not indicate a handover because the source GMLC 155S can continue to send location requests for the UE 105 to the source LMF 152S (as at stage 2) and does not need to be aware of the handover. For intra-RAN handover where the source LMF 152S will not continue to function as the target LMF, the source LMF 152S may not indicate a handover because the target LMF 152T can provide an update as described below for stage 11.

As stage 9b, if stages 2 and 9a do not occur and if handover is inter-RAN (e.g. to E-UTRAN), the source LMF 152S may send a message (e.g. a Subscriber Location Report) to the source GMLC 155S carrying the UE 105 identity (e.g. IMSI, MSISDN. IMEI, SUPI or PEI), an event type indicating handover and the identity of the target node 153. Stage 9b may not occur if a handover update on the target side occurs as at stage 12.

At stage 10, the source GMLC 155S may acknowledge the message at stage 9b if this occurs. The source LMF 152S releases resources for the emergency call except for intra-RAN handover where the source LMF 152S will continue to function as the target LMF.

At stage 11, for intra-RAN handover to a target AMF 154T where the source LMF 152S will not continue as the target LMF, stages 10-12 in FIG. 10 are performed and stages 12 and 13 below are omitted.

At stage 12, for inter-RAN handover (e.g. to E-UTRAN) and if control plane location will be used on the target side, the target node 153 (e.g. MME) may send a message (e.g. a Subscriber Location Report) to a GMLC 155T on the target side after completion of the handover at stage 6. The message carries the UE 105 identity (e.g. IMSI, MSISDN, IMEI, SUPI or PEI), an event type indicating handover and the identity of the target node 153. The target node 153 may determine the target GMLC 155T from configuration information. Stage 12 is an alternative to stage 9b for inter-RAN handover with only one of these stages needed.

At stage 13, the target GMLC 155T may acknowledge the message at stage 12 if stage 12 occurs.

At stage 14, for inter-RAN handover (e.g. where stage 9b or stage 12 occurs) or for intra-RAN handover where a new target LMF 154T is selected by the target AMF 154T at stage 11, reconfiguration of the LRF 157 and the source and target GMLCs 155S and 155T may occur. For example, the source GMLC 155S or target GMLC 155T may provide information (obtained at an earlier stage) to the LRF 157 regarding the handover and the LRF 157 may replace the source GMLC 155S with the target GMLC 155T for any future location request for UE 105.

At stage 15, if the LRF 157 needs a location estimate for the UE 105 after handover has occurred and if control plane location is used on the target side, the LRF 157 may instigate an MT-LR request via either a new target GMLC 155T (e.g. if handover was inter-RAN) or via the original source GMLC 155S (e.g. if handover was intra-RAN and the source LMF 152S will continue to function as the target LMF). The MT-LR may be supported either according to the new RAN if handover was inter-RAN (e.g. may be supported as an EPC MT-LR for handover to E-UTRAN) or as described for FIG. 8 if handover was intra-RAN.

FIG. 10 shows support for location continuity for handover of an IMS emergency call to NG-RAN 112 on the target side from a different RAN (e.g. E-UTRAN) on the source side.

At stage 1 in FIG. 10, following the request for an emergency call, the UE 105 establishes an emergency connection and IP bearers appropriate to the source RAN. The UE 105 may then establish an IMS emergency call during which an LRF 157 is assigned and a source location server 155S (e.g. a GMLC) may be chosen.

At stage 2, at some later time, the source serving node 162 (e.g. which may be an MME when the source RAN is E-UTRAN) may receive a request from the source location server 155S (e.g. which may be a GMLC) for the location of the UE 105 if control plane location is used on the source access side.

At stage 3, if stage 2 occurs or if support for an NI-LR is required, the source node 162 starts a location session appropriate to the source RAN to obtain the location of the UE 105.

At stage 4, a request is later sent to the source node 162 for a handover to a particular base station (e.g. a gNB 110 or ng-eNB 114) or target cell for NG-RAN 112.

At stage 5, the source node 162 sends a Handover Request message to the target AMF 154T.

At stage 6, the rest of the handover procedure is completed.

At stage 7, any location session started at stage 3 may terminate normally before stage 6 is complete. If not, the source node 162 aborts the location session once stage 6 is complete. This may lead to provision of a location estimate for the UE 105 to the source node 162.

At stage 8a, if a control plane location solution is used on the source side and stage 2 occurs, the source node 162 returns a response (e.g. a Provide Subscriber Location response) to the source GMLC 155S carrying any location estimate obtained previously for the UE 105. Depending on configuration information in the source node 162, the response may convey the identity of the target AMF 154T. The target AMF 154T identity may only be returned at stage 8a or stage 8b if a user plane (e.g. SUPL) location solution will be used on the target side as updating of the target GMLC 155T and LRF 157 can occur more completely and correctly according to stage 11 below when control plane location is used on the target side.

At stage 8b, if control plane location is used on the source side but stages 2 and 8a do not occur, the source node 162 may depending on configuration information in the source node (e.g. as at stage 8a) send a message (e.g. a Subscriber Location Report message) to the source location server 155S carrying the UE 105 identity (IMSI, MSISDN, IMEI, SUPI or PEI), an event type indicating handover and the identity of the target AMF 154T.

At stage 9, the source location server 155S may acknowledge the message at stage 8b if this occurs.

At stage 10, if control plane location is used on the target (NG-RAN 112) side, the target AMF 154T selects a target LMF 152T and sends an event notification (e.g. an emergency status message) to the target LMF 152T indicating handover of an emergency call and including an identity for the UE 105 (e.g. IMSI, MSISDN, IMEI, SUPI or PEI) and the identity of the target AMF 154T. The target AMF 154T may also include the serving cell ID, and a local ID for the UE 105 assigned by the target AMF 154T. The target LMF 152T then stores the UE identity (or identities) and the target AMF 154T identity. The target AMF 154T stores the target LMF 152T identity.

At stage 11, if control plane location is used on the target (NG-RAN 112) side, the target LMF 152T sends a message (e.g. a Subscriber Location Report) to a GMLC 155T on the target side. The message carries the UE 105 identity (e.g. IMSI, MSISDN, IMEI, SUPI or PEI), an event type indicating handover and the identity of the target LMF 152T. The target LMF 152T may determine the address of the target GMLC 155T from configuration information.

At stage 12, the target GMLC 155T may acknowledge the message at stage 11.

At stage 13, reconfiguration of the LRF 157 and the source and target location servers 155S, 155T may occur. For example, the source location server 155S or target GMLC 155T may provide information (obtained at an earlier stage) to the LRF 157 regarding the handover and the LRF 157 may replace the source location server 155S with the target GMLC 155T for any future location request for UE 105.

At stage 14, if the LRF 157 needs a location estimate for the UE 105 after handover has occurred, it may instigate an MT-LR request via the target GMLC 155T if control plane location solution will be used on the target side. This may occur as described for FIG. 8.

Figure 11:
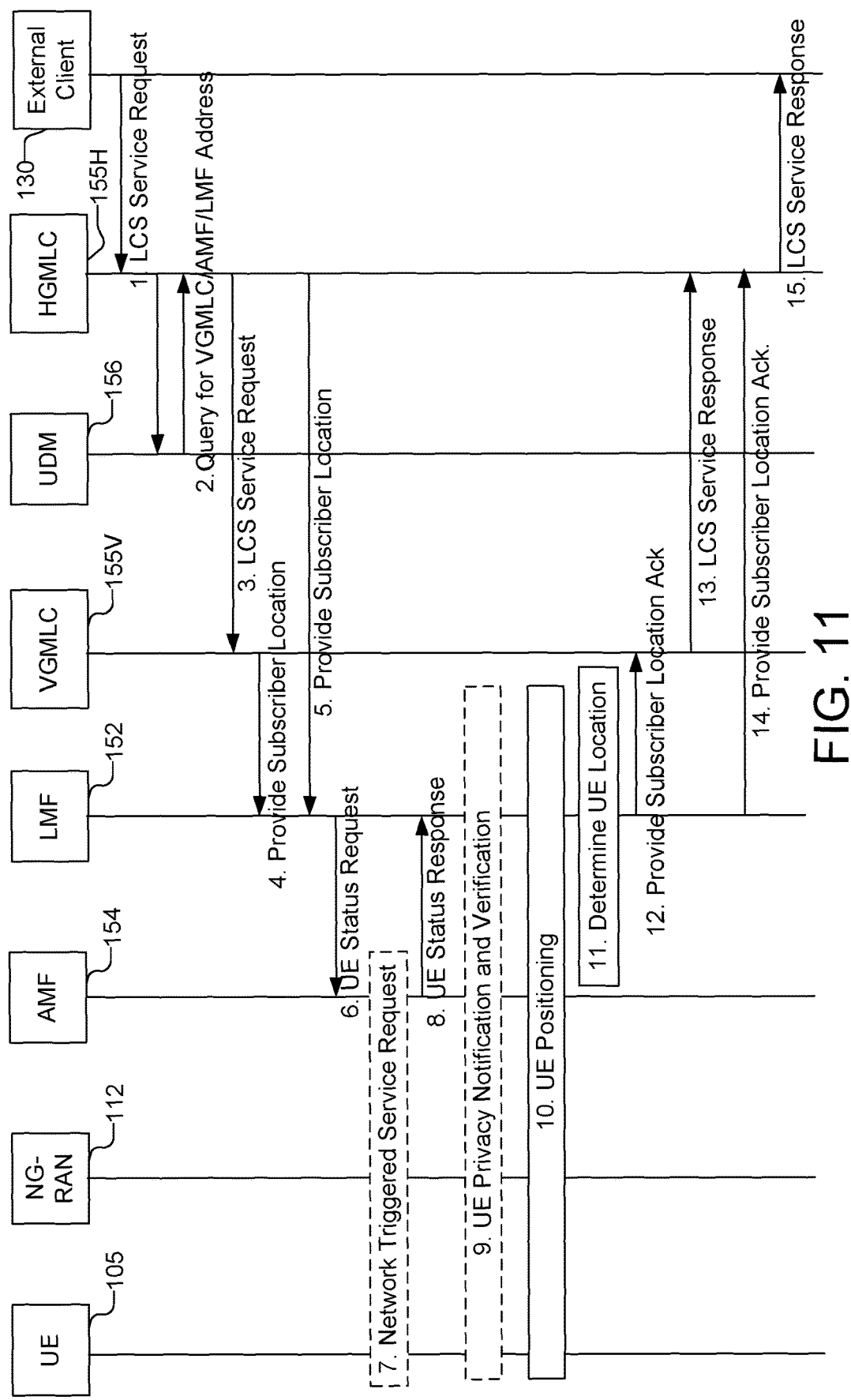
FIG. 11 is a message flow illustrating a Mobile Terminated Location Request (MT-LR) procedure for a roaming UE.

FIG. 11 shows a Mobile Terminated Location Request (MT-LR) procedure for a roaming UE 105. The procedure allows for location of the LMF 152 in either the VPLMN 5GC 150 as in communication system 200 or in the HPLMN 5GC 140 as in communication system 300. An MT-LR procedure for a non-roaming UE 105 (e.g. as in communication system 100) may comprise a subset of the procedure shown and described below for FIG. 11, which would be well understood by those skilled in the art in light of the present disclosure.

At stage 1 in FIG. 11, an external client 130 sends a location request to an HGMLC 155H in the HPLMN 5GC 140 for the UE 105. The HGMLC 155H may verify UE 105 privacy requirements.

At stage 2, the HGMLC 155H queries the UDM 156 for the VGMLC 155V address, the serving AMF 154 address and possibly an LMF 152 address in the VPLMN 5GC 150.

At stage 3, based on HPLMN 140 and VPLMN 150 policies and roaming agreements, the HGMLC 155H determines whether the LMF 152 will be in the VPLMN 5GC 150 or HPLMN 5GC 140. If the LMF 152 will be in the VPLMN 5GC 150, the HGMLC 155H forwards the location request to the VGMLC 155V (e.g. using the OMA Roaming Location Protocol (RLP)) and includes the AMF 154 address, the UE 105 identity (e.g. an IMSI, MSISDN or SUPI) and any privacy requirements for the UE 105.

At stage 4, and if the LMF 152 will be in the VPLMN 5GC 150, the VGMLC 155V determines an LMF 152 in the VPLMN 150 (e.g. based on the AMF 154 address) and forwards the location request to the LMF 152 including the AMF 154 address, the UE 105 identity and any privacy requirements for UE 105. If the VGMLC 155V and LMF 152 functions are combined, stage 4 may be omitted.

The VGMLC 155V may determine the LMF 152 according to any one of four different techniques at stage 4 which are labelled T1, T2, T3 and T4.

With technique T1, if VGMLCs, LMFs and AMFs are fully interconnected in VPLMN 5GC 150 (e.g. via an operator IP intranet), VGMLC 155V may determine an LMF 152 based on any suitable criteria (e.g. location QoS, type of external client 130, VGMLC 155V ID) and independently of the AMF 154 identity. As one example, VGMLC 155V could be configured with all LMFs in the VPLMN 5GC 150 and could select LMFs on a round robin basis.

With technique T2, if AMFs and LMFs are paired one to one in VPLMN 5GC 150, VGMLC 155V could map the AMF 154 address (e.g. a Fully Qualified Domain Name (FQDN) originally received by HGMLC 155H from UDM 156 at stage 2) to the LMF 152 address (e.g. by replacing "AMF" labels in an AMF 154 FQDN with "LMF" labels and keeping all numeric IDs in the AMF 154 FQDN the same).

With technique T3, if an AMF 154 is allowed to use some but not all LMFs in the VPLMN 5GC 150, VGMLC 155V could be configured with the allowed LMFs for each AMF 154, and could then select an LMF 152 from the allowed LMFs based on specific criteria (e.g. QoS) or randomly.

With technique T4, when a UE 105 registers with a serving 5GC 150, the serving AMF 154 could select an LMF 152 and provide the LMF 152 address to the UDM 156 along with the AMF 154 address. The UDM 156 can then provide the LMF 152 address to the HGMLC 155H, as at stage 2 above, and the HGMLC 155H can provide the LMF 152 address to the VGMLC 155V at stage 3.

At stage 5 in FIG. 11, if the LMF 152 will be in the HPLMN 5GC 140, the communication in stages 3 and 4 is omitted and the HGMLC 155H instead determines an LMF 152 in the HPLMN 5GC 140 (e.g. based on the VPLMN 150 identity or the UE 105 identity or using some fixed LMF 152). The HGMLC 155H then forwards the location request to the LMF 152 and includes the AMF 154 address, the UE identity (e.g. IMSI, MSISDN or SUPI) and any privacy requirements for UE 105. If the HGMLC 155H and LMF 152 functions are combined, stage 5 may be omitted.

Stage 5 may also be performed instead of the communication at stages 3 and 4 as an optimization for an LMF 152 in the VPLMN 5GC 150 if the HGMLC 155H can determine the LMF 152 address (e.g. based on the VPLMN 150 identity or the AMF 154 address or if an LMF 152 address in the VPLMN 5GC 150 is received from the UDM 156 at stage 2).

At stage 6, optionally, the LMF 152 requests UE 105 status information from the AMF 154 and may request that the UE 105 be placed in connected state if currently idle.

At stage 7, if the UE 105 is currently idle but reachable, and if requested by the LMF 152 at stage 6, the AMF 154 pages the UE 105 in order to place the UE 105 in connected state.

At stage 8, the AMF 154 returns the UE 105 status to the LMF 152 including whether reachable or not reachable, optionally an expected time when an unreachable UE 105 will again become reachable, and whether a reachable UE 105 is currently idle or connected. The AMF 154 may also return the current serving cell for the UE 105 (or last known serving cell if the UE 105 is in idle state), a local UE identifier (ID) assigned by the AMF 154 and may include certain UE subscription information (e.g. defining UE privacy requirements). If stages 6-8 are not performed, the LMF 152 can still perform stage 10 to obtain location information from the NG RAN 112 and UE 105 but would need to include a global identity of the UE 105 (e.g. an IMSI, MSISDN, or SUPI) rather than a local AMF 154 assigned ID when transferring a positioning message to the NG-RAN 112 or UE 105 as described for FIGS. 4 and 5

At stage 9, the LMF 152 may notify UE 105 of the location request and optionally verify UE 105 privacy requirements, based either on UE 105 subscription information received from the AMF 154 at stage 8 or on privacy requirements sent by the HGMLC 155H at stages 3-5. Notification and verification of privacy requirements may occur at stage 9 using a supplementary services interaction with the UE 105. The supplementary services interaction may be supported as described for the downlink positioning procedure in FIG. 4, where supplementary service messages are transferred between LMF 152 and UE 105 instead of DL and UL positioning messages (as in FIG. 4). For example, LMF 152 may send a supplementary service message (e.g. a Location Notification Request) to UE 105 to notify UE 105 of the location request (e.g. and provide an identity of external client 130 to UE 105) and to query a privacy requirement for UE 105. UE 105 may then return a supplementary service message (e.g. a Location Notification Response) to LMF 152 indicating whether the location request from external client 130 is to be allowed or not allowed.

At stage 10, and assuming that the location request is not disallowed by UE 105 at stage 9, the LMF 152 may transfer assistance data to the UE 105 and/or obtain location information from the UE 105 and/or from NG-RAN 112 as described in FIGS. 4-6. In the event of an inter-AMF handover or cell change for the UE 105 while positioning is in progress at stage 10, the old AMF 154 can return an error indication to the LMF 152 (and possibly include the address of the new AMF 154) when the LMF 152 attempts to send a positioning message to the UE 105 or NG-RAN 112 via the old AMF 154. The LMF 152 may then query the UDM 156 for the address of the new AMF 154 (e.g. if not received from the old AMF 154). Provided the LMF 152 is able to access the new AMF 154, the LMF 152 can perform stages 6-8 to obtain new UE 105 status information from the new AMF 154 (e.g. the current serving cell and a new local UE ID assigned by the new AMF 154). In addition, if LMF 152 already instigated location measurements at UE 105 as described for FIG. 4, an UL positioning message carrying any location measurements returned later by UE 105 to LMF 152 (e.g. as at stages 7-9 in FIG. 4) may be routed correctly by the new AMF 154 to LMF 152 as long as the routing ID used in FIG. 4 is a global or local ID for the LMF 152 that is recognizable by the new AMF 154. In this case, when the LMF 152 receives the UL positioning message, LMF 152 can become aware of the handover or cell change by observing that the sending AMF 154 is different to the old AMF 154. These aspects may enable the location session for UE 105 at stage 10 to continue after an inter-AMF handover or inter-AMF cell change for UE 105.

At stage 11, the LMF 152 determines (e.g. calculates) a location estimate for the UE 105 based on information obtained at stages 8 and 10.

At stages 12-15, the LMF 152 returns the location estimate to the external client 130 via the VGMLC 155V and/or HGMLC 155H.

Figure 12:
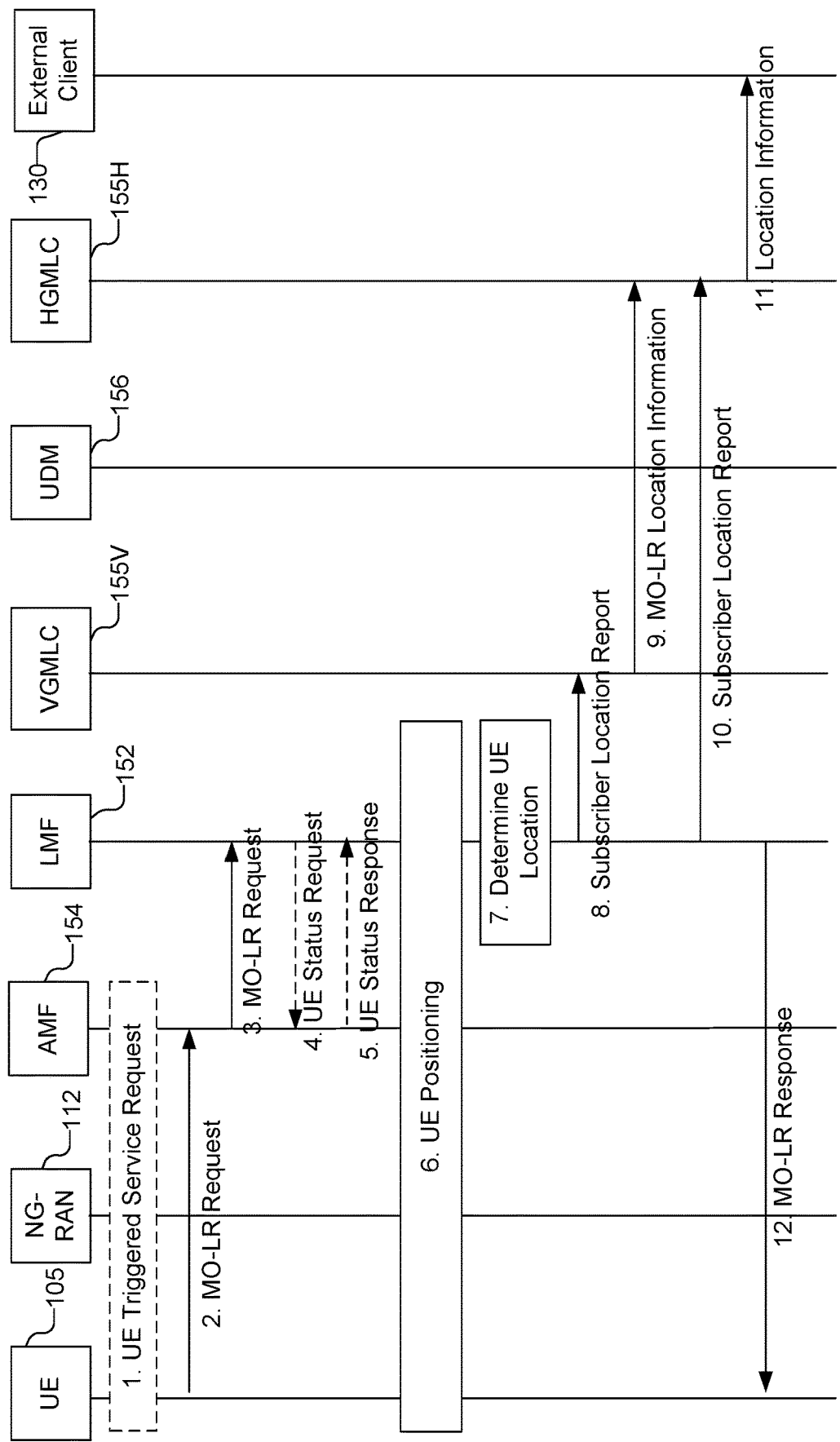
FIG. 12 is a message flow illustrating a Mobile Originated Location Request (MO-LR) procedure for a roaming UE.

FIG. 12 summarizes a Mobile Originated Location Request (MO-LR) procedure for a roaming UE 105. The procedure allows for location of the LMF 152 in either the VPLMN 5GC 150 as in communication system 200 or in the HPLMN 5GC 140 as in communication system 300. An MO-LR procedure for a non-roaming UE 105 (e.g. as in communication system 100) may comprise a subset of the procedure shown and described below for FIG. 12, which would be well understood by those skilled in the art in light of the present disclosure.

At stage 1 in FIG. 12, the UE 105 performs a service request if in an idle state in order to obtain a signaling connection to a serving AMF 154.

At stage 2, the UE 105 sends a supplementary services MO-LR request to the serving AMF 154 (e.g. inside a NAS transport message) indicating a request for a location estimate, location assistance data or sending of a location estimate to an external client 130 via transfer to third party (TTTP). For TTTP, the UE 105 identifies the external client 130 and possibly the HGMLC 155H. The UE 105 may also include a routing ID indicating a particular LMF 152 in the HPLMN 140 (e.g. configured in the UE 105) or indicating that an LMF 152 (e.g. any LMF 152) in the VPLMN 150 can be used.

At stage 3, if an LMF 152 in the HPLMN 140 was indicated at stage 2, the AMF 154 forwards the MO-LR request to this LMF 152, if the VPLMN 150 and HPLMN 140 have an agreement to support this. Otherwise, if an LMF 152 in the VPLMN 150 is indicated at stage 2, or if no routing ID is included at stage 2, or if there is no agreement to support an LMF 152 in the HPLMN 140, the AMF 154 determines an LMF 152 in the VPLMN 5GC 150 and forwards the MO-LR to this LMF 152. For both cases, the AMF 154 includes an identity for the UE 105 (e.g., IMSI, MSISDN or SUPI) and may include the serving cell ID, a local ID for the UE 105 assigned by the AMF 154 and certain subscription information for the UE 105 (e.g. concerning subscription to MO-LR support).

At stage 4, the LMF 152 optionally queries the AMF 154 for UE 105 status information as at stage 6 in FIG. 11 if status related information was not included by the AMF 154 at stage 3.

At stage 5, the AMF 154 returns UE 105 status information (e.g. serving cell ID, a local UE ID assigned by the AMF 154 and UE 105 subscription to an MO-LR) as at stage 8 of FIG. 11.

The LMF 152 verifies UE 105 subscription to an MO-LR. For an LMF 152 in the VPLMN 150, subscription information obtained from the AMF 154 at stage 3 or stage 5 can be used for this. For an LMF 152 in the HPLMN 140, the subscription information may instead be configured in the LMF 152.

At stage 6, the LMF 152 may transfer assistance data to the UE 105 and obtain location information from the UE 105 and/or from NG-RAN 112 as described in FIGS. 4-6.

At stage 7, if a location was requested at stage 2, the LMF 152 determines (e.g. calculates) a location estimate for the UE 105 based on information obtained at stages 3, 5, and/or 6.

If TTTP was not requested at stage 2, stages 8-11 are omitted. Otherwise at stage 8 (if TTTP is requested at stage 2), if the LMF 152 is in the VPLMN 150, the LMF 152 determines a VGMLC 155V in the VPLMN 150 and sends the UE 105 location to the VGMLC 155V (e.g. in a Subscriber Location Report message) and includes the identity of the UE 105 (e.g. IMSI, MSISDN or SUPI), the external client 130 ID and any HGMLC 155H address provided at stage 2. The message transfer for stage 8 can be omitted if the LMF 152 and VGMLC 155V functions are combined in the same entity.

At stage 9, if stage 8 has occurred, the VGMLC 155V forwards the location, the UE 105 identity and external client 130 identity to the HGMLC 155H. The VGMLC 155V may determine the HGMLC 155H address if not provided at stage 8 from the HPLMN 140 identity inferred from the UE 105 identity.

At stage 10, if TTTP is requested at stage 2 and if the LMF 152 is in the HPLMN 140, stages 8 and 9 are omitted, and the LMF 152 instead determines an HGMLC 155H address (e.g. using an HGMLC 155H address provided at stage 2). The LMF 152 then sends the UE 105 location to the HGMLC 155H and includes the identity of the UE 105 (e.g. IMSI, MSISDN or SUPI) and the eternal client 130 ID. Stage 10 can be omitted if the LMF 152 and HGMLC 155H functions are combined in the same entity.

Stage 10 may also be performed instead of stages 8 and 9 as an optimization for an LMF 152 in the VPLMN 150 if the HGMLC 155H address is provided by the UE 105 at stage 2 or can be determined by the LMF 152 (e.g. based on the HPLMN 140 identity as inferred from the UE 105 identity).

At stage 11, the HGMLC 155H provides the UE 105 location and a UE 105 identity to the external client 130.

At stage 12, the LMF 152 returns an MO-LR response to the UE 105 via the AMF 154 confirming completion of the MO-LR request at stage 2 and including any location determined at stage 7.

Figure 13:
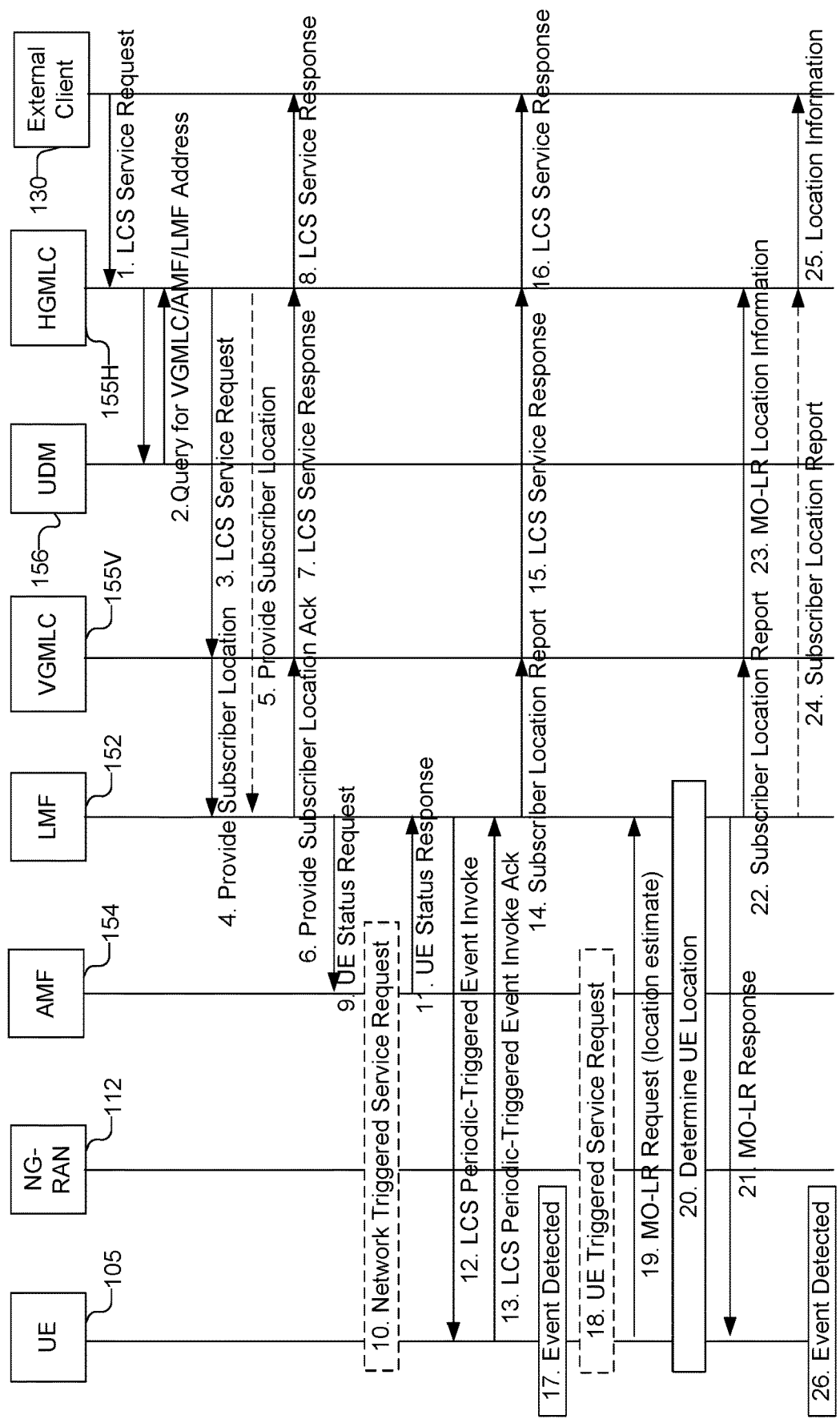
FIGS. 13 and 14 are message flows illustrating MT-LR procedures for a roaming UE to support periodic and triggered location.

FIG. 13 summarizes an MT-LR procedure for a roaming UE 105, as in communication system 200 or 300, to support periodic and triggered location in a manner similar to that supported by the Deferred EPC-MT-LR procedure for Periodic and Triggered Location defined for EPC in 3GPP TS 23.271. A corresponding procedure for a non-roaming UE 105, as in communication system 100, would comprise a subset of the procedure shown in FIG. 13, which would be well understood by those skilled in the art in light of the present disclosure.

At stage 1 in FIG. 13, an external client 130 sends a location request for periodic and triggered location for a UE 105 to an HGMLC 155H in the HPLMN 140 for the UE 105. The location request provides the type of location reporting being requested and associated parameters. For periodic location, the request may include the time interval between successive location reports and the total number of reports. For area event reporting, the request may include details of the target area, whether the trigger event to be reported is the UE 105 being inside, entering into or leaving the target area, and the duration of reporting. For motion event reporting, the request may include a threshold linear distance for triggering a location report and the duration of reporting. Other types of triggered location reporting may also or instead be requested along with associated parameters (e.g. such as reporting when a velocity of UE 105 exceeds some threshold value). The HGMLC 155H may verify UE 105 privacy requirements.

At stage 2, the HGMLC 155H queries the UDM 156 for the VGMLC 155V address, serving AMF 154 address and possibly an LMF 152 address in the VPLMN 150.

At stages 3-5, based on HPLMN 140 and VPLMN 150 policies and roaming agreements, the HGMLC 155H determines whether the LMF 152 will be in the HPLMN 140 or VPLMN 150. The HGMLC 155H then forwards the location request to the LMF 152 via a VGMLC 155V or directly as described for stages 3-5 of FIG. 11. The HGMLC 155H includes in the location request the AMF 154 address, the UE 105 identity (e.g. IMSI, MSISDN or SUPI), the type of location reporting being requested and associated parameters, a reference number to be used to identify later responses, and any privacy requirements for the UE 105. For area event reporting, the HGMLC 155H, VGMLC 155V or LMF 152 may convert the target area into an equivalent set of cells. Tracking Areas (TAs) and/or location areas (LAs) for VPLMN 150 (e.g. for NG-RAN 112). The VGMLC 155V may determine the LMF 152 as described for stage 4 of FIG. 11 using any of Techniques T1-T4 in the case that stage 3 and stage 4 occur in FIG. 13.

At stages 6-8, if the LMF 152 supports periodic and triggered location, the LMF 152 returns an acknowledgment to the external client 130, via the VGMLC 155V and/or HGMLC 155H, indicating that the request for periodic or triggered location was accepted.

At stages 9-11, the LMF 152 may query the AMF 154 for UE 105 status and subscription information and may request the AMF 154 to place the UE 105 in a connected state if currently reachable and idle as at stages 6-8 of FIG. 11. If the UE 105 is not currently reachable, the LMF 152 may request the AMF 154 to indicate when the UE 105 becomes reachable (and optionally to place the UE 105 in connected state when the UE 105 becomes reachable) by a repetition of stages 9-11 or by performing stages similar to stages 9-11.

Once the UE 105 is reachable, the LMF 152 may verify UE 105 privacy requirements, based on UE 105 privacy related information received from the HGMLC 155H at stages 3-5 or from the AMF 154 at stage 11, via a supplementary services interaction with the UE 105 as at stage 9 in FIG. 11 (not shown in FIG. 13).

At stage 12, the LMF 152 sends a supplementary services message (e.g. a Location Services (LCS) Periodic-Triggered Event Invoke) to the UE 105 via the AMF 154 carrying the location request information received from the VGMLC 155V or HGMLC 155H, the reference number assigned by the HGMLC 155H and the HGMLC 155H address. The AMF 154 may include a routing ID in a NAS transport message used to convey the supplementary services message to the UE 105 (e.g. as described for conveyance of a DL positioning message for FIG. 4) which can be used by UE 105 to route later messages back to the same LMF 152. The LMF 152 can indicate in the supplementary services message whether later trigger event reports (e.g. at stage 19) are to be sent to the same LMF 152 via use of this routing ID or may be sent to some other LMF 152 in VPLMN 5GC 150.

At stage 13, if the request at stage 12 can be supported by UE 105, UE 105 returns an acknowledgment to the LMF 152 via the AMF 154.

At stages 14-16, the LMF 152 sends a confirmation to the external client 130 via the VGMLC 155V and/or HGMLC 155H that event reporting for periodic or triggered location has been activated in the UE 105. The LMF 152 and the VGMLC 155V (if used) can then release state information for the periodic and triggered MT-LR request. Alternatively, if LMF 152 will continue to support location event reporting for stages 17-25, LMF 152 may retain state information for the periodic and triggered MT-LR request, which may reduce processing at LMF 152 (compared to using a different LMF 152) by avoiding a need to setup and later release resources for location of UE 105. In addition, retention of state information for the periodic and triggered MT-LR request by LMF 152 may enable usage of previous location information for UE 105 by LMF 152 (e.g. previous serving cell IDs, previous measurements of gNBs 110, ng-eNBs 114 and/or SVs 190 by UE 105) which may enable more accurate, more efficient and/or faster location of UE 105 at stage 20.

At stage 17, the UE 105 monitors for occurrence of the trigger event requested at stage 12 (e.g. a periodic trigger event, an area trigger event or a motion trigger event). When a trigger event is detected, the UE 105 proceeds to stage 18.

At stage 18, the UE 105 performs a service request if in an idle state to obtain a connection to a serving AMF 154. The serving AMF for stages 18-25 may differ from the serving AMF for stages 2-16, e.g. if UE 105 has moved to a new location.

At stage 19, the UE 105 sends a supplementary services MO-LR request to an LMF 152 via the current serving AMF 154 indicating an event report for a periodic and triggered location request. The request includes the type of trigger event being reported, the HGMLC 155H address and the reference number. The request may also include a location estimate. The UE 105 may ensure the MO-LR request is routed by the serving AMF 154 to the same LMF 152 that initiated the periodic and triggered location request at stage 12 by including the routing ID received at stage 12 with the MO-LR request sent to the serving AMF 154. This may be useful or necessary if the LMF 152 is in the HPLMN 140 and/or is combined with the HGMLC 155H since signaling and/or charging can then be more efficient. This may also be useful or necessary if the same LMF 152 is to be used in the VPLMN 5GC 150 as described above. Otherwise, the UE 105 can indicate that any LMF 152 in the VPLMN 5GC 150 may be used.

At stage 20, if a location estimate was not included at stage 19, or was included but is not accurate or reliable enough, and if a location estimate is expected or was requested by external client 130 (e.g. at stage 1), the LMF 152 performs stages 10 and 11 of FIG. 11 to obtain a location estimate for the UE 105.

At stage 21, the LMF 152 returns an MO-LR return result to the UE 105 via the serving AMF 154 to confirm that an event report will be sent to the external client 130.

At stage 22, if the LMF 152 is in the VPLMN 150, the LMF 152 selects a VGMLC 155V (which may be different to the VGMLC 155V for stages 3-7) and sends a message (e.g. a Subscriber Location Report) to the VGMLC 155V with an indication of the type of event being reported, the reference number, the HGMLC 155H address and the location estimate if received or obtained. Stage 22 may be omitted if the LMF 152 and the VGMLC 155V are combined.

At stage 23, the VGMLC 155V forwards the information received at stage 22 to the HGMLC 155H.

At stage 24, if the LMF 152 is in the HPLMN 140 or as an optimization when the LMF 152 is in the VPLMN 5GC 150, stages 22 and 23 are omitted and the LMF 152 instead sends the information for stage 22 directly to the HGLMC 155H. Stage 24 may be omitted if an LMF 152 in the HPLMN 140 and the HGMLC 155H are combined.

At stage 25, the HGMLC 155H uses the reference number received at stage 23 or stage 24 to identify the periodic and triggered location request received at stage 1 and then sends the type of trigger event being reported and the location estimate, if received, to the external client 130.

At stage 26, the UE 105 continues to monitor for further trigger events and instigates stages 18-25 each time a trigger event is detected until the duration or number of events reports for the periodic and triggered location is attained.

Figure 14:
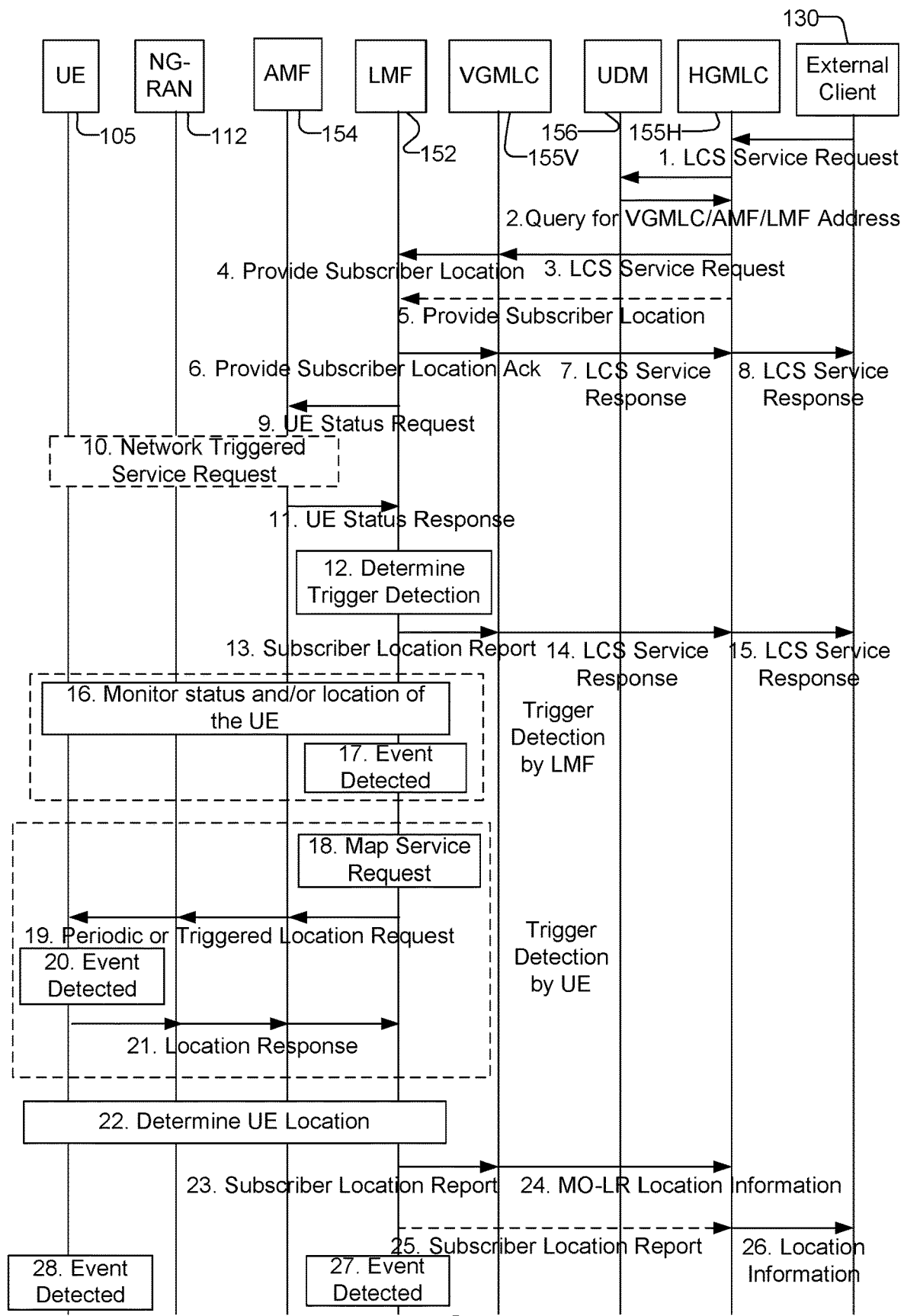

FIG. 14 shows an optimized MT-LR procedure for a roaming UE 105, as in communication system 200 or 300, to support periodic and triggered location in a manner similar to that supported by the Deferred EPC-MT-LR procedure for Periodic and Triggered Location defined for EPC in 3GPP TS 23.271. A corresponding optimized procedure for a non-roaming UE 105, as in communication system 100, would comprise a subset of the procedure shown in FIG. 14, which would be well understood by those skilled in the art in light of the present disclosure. The optimized procedure in FIG. 14 may be functionally the same as or similar to the procedure in FIG. 13 but may reduce implementation impacts to the UE 105 and LMF 152 and/or may reduce processing and/or signaling by LMF 152 and UE 105. With the optimized procedure, support is not needed by either the LMF 152 or UE 105 for an MO-LR procedure or for supplementary service level instigation of periodic and triggered location. Instead, the LMF 152 may perform the trigger event detection itself, or the LMF 152 may use periodic and triggered location support in a positioning protocol (e.g. LPP or NPP) to request the UE 105 to perform the trigger event reporting at the positioning protocol level. For example, LPP as defined in 3GPP TS 36.355 supports limited periodic location of a UE 105 and limited triggered location based on a change of serving cell and these capabilities could be extended (e.g. to support area event triggers and motion event triggers). Alternatively or in addition, periodic and triggered location support might be included in NPP.

At stages 1-11 in FIG. 14, the stages 1 to 11 from FIG. 13 are performed. In addition, once the UE 105 is reachable (e.g. following stage 11), the LMF 152 may verify UE 105 privacy requirements, based on UE 105 privacy related information received from the HGMLC 155H at stages 3-5 or from the AMF 154 at stage 11, via a supplementary services interaction with the UE 105 as at stage 9 in FIG. 11 (not shown in FIG. 14).

At stage 12 in FIG. 14 the LMF 152 determines whether to use trigger event detection by the LMF 152 or by the UE 105, e.g., based on the type of periodic or triggered location being requested, the LMF 152 capabilities, the UE 105 capabilities (if known) and whether the UE 105 employs a power saving mode and is currently reachable. For trigger event detection by the LMF 152, stages 16-17 are performed and stages 18-21 are omitted. For trigger event detection by the UE 105, stages 18-21 are performed and stages 16-17 are omitted. In some implementations, an LMF 152 may use both types of trigger detection—e.g. by alternating between one type and the other or by using both types in parallel.

At stages 13-15, for trigger event detection by the LMF 152 and optionally for trigger event detection by the UE 105, stages 14-16 of FIG. 13 are performed after stage 12. For trigger event detection by the UE 105, stages 13-15 may be performed after stage 19, after a confirmation is received from UE 105 for the request at stage 19 (not shown in FIG. 14), or after the LMF 152 obtains the UE positioning capabilities (e.g. using LPP or NPP and not shown in FIG. 14) and verifies the UE capability to support periodic and triggered location.

At stage 16, for trigger detection by the LMF 152, the LMF 152 may monitor the status and/or location of the UE 105 by (a) performing stages 6-8 of FIG. 11 periodically to obtain the current serving cell or serving TA for the UE 105, (b) performing stage 10 of FIG. 11 to obtain a location estimate or location measurements from the UE 105 and/or from NG-RAN 112, and/or (c) requesting to be notified by the serving AMF 154 when UE 105 changes a serving cell or a serving TA. When periodic (rather than triggered) location of the UE 105 was requested at stage 1, stage 16 may be omitted.

At stage 17, the LMF 152 uses the information obtained at stage 16 or other information (e.g. the current time) to detect when a trigger event has occurred. When a trigger event is detected the LMF 152 proceeds to stage 22.

At stage 18, for trigger event detection by the UE 105, the LMF 152 maps the service request received at stage 4 or stage 5 into a corresponding request for periodic or triggered location supported by a positioning protocol (e.g. LPP or NPP). This mapping may be exact if the positioning protocol support is equivalent to that requested by an external client 130 at stage 1. Otherwise, if the positioning protocol supports only a subset of the periodic and triggered location reporting that may be requested by an external client 130 at stage 1 (e.g. supports periodic location reporting and triggered location reporting for a change of serving cell as defined for LPP), the LMF 152 may perform an approximate mapping. For example, for area event reporting, the LMF 152 may map the request to a triggered location request where the UE 105 provides a location report whenever there is a change in the serving cell: the LMF 152 may then use the new serving cell to determine whether an area event (e.g. leaving, entering or remaining within a target area) has occurred. For motion event reporting, the LMF 152 may map the request to periodic location reporting: the LMF 152 may then use the periodically obtained UE 105 location to determine whether a threshold linear distance for triggering a location report has been attained.

At stage 19, the LMF 152 sends a DL positioning protocol message (e.g. an LPP or NPP message) to the UE 105 via the AMF 154, as described for stages 1-4 of FIG. 4, requesting periodic or triggered location reporting by the UE 105 as determined by the LMF 152 at stage 18. The LMF 152 indicates in the DL positioning protocol message the type of location measurements or location estimate to be provided by the UE 105 for location reporting at stage 21. The UE may return an UL positioning protocol message (e.g. an LPP or NPP message) to the LMF 152 via the serving AMF 154 to confirm the request at stage 19 (not shown in FIG. 14).

At stage 20, the UE 105 monitors for occurrence of the trigger event requested at stage 19 (e.g. a periodic trigger event or a change of cell trigger event). The monitoring may occur while the UE 105 is in an idle state and/or while the UE 105 is unreachable from the network (e.g. with Extended Discontinuous Reception (eDRX) or Power Saving Mode (PSM)). The UE 105 may also (e.g. periodically) request and obtain assistance data from the LMF 152, or may obtain broadcast assistance data from NG-RAN 112, to help determine a location, if needed to detect a trigger event. When a trigger event is detected, the UE 105 proceeds to stage 21.

At stage 21, the UE 105 performs a service request if in an idle state to obtain a signaling connection to a serving AMF 154 (which may differ from the serving AMF 154 for stage 19) and returns an UL positioning protocol message (e.g. an LPP or NPP message) to the LMF 152 via the AMF 154, as described for stages 7-9 of FIG. 4. The UL positioning protocol message may include an indication of the trigger event detected at stage 20 and/or location measurements or a location estimate (e.g. as requested at stage 19).

At stage 22, the LMF 152 may determine a location estimate for the UE 105 based on any location measurements or location estimate received at stage 21 in the case of UE 105 trigger event detection or based on UE 105 status or location information obtained at stage 16 in the case of LMF 152 trigger event detection. If necessary (e.g. to obtain a more accurate location estimate), the LMF 152 may obtain location measurements or a location estimate for UE 105 from UE 105 and/or from NG-RAN 112, as at stage 10 of FIG. 11, to help determine a location estimate. For UE 105 trigger event detection, the LMF 152 may verify (e.g. using a location estimate determined at stage 22) whether the trigger event detected by the UE 105 at stage 20 corresponds to a trigger event requested by the external client 130 at stage 1 (e.g. if the request at stage 19 is not an exact match for the external client 130 request at stage 1 due to mapping of the service request at stage 18).

At stages 23-26, if a trigger event has occurred (e.g. was detected at stage 17 or stage 20 and/or verified at stage 22), the LMF 152 instigates stages 22-25 in FIG. 13 to return an indication of the trigger event and the UE 105 location if obtained at stage 22 to the external client 130.

At stage 27, for trigger event detection by the LMF 152, the LMF 152 continues to monitor for further trigger events as at stage 16 and instigates stages 22-26 each time a trigger event is detected, until the duration or number of events reports for the periodic and triggered location is attained.

At stage 28, for trigger event detection by the UE 105, the UE 105 continues to monitor for further trigger events as at stage 20 and instigates stages 21-26 each time a trigger event is detected, until the duration or number of events reports for the periodic and triggered location is attained.

As can be observed from the above described architecture and procedures, the 5GC CP (LMF based) location solution includes several characteristics and benefits. For example, the impacts on the AMF (e.g. AMF 154) are reduced compared to a traditional AMF based CP location solution, as the AMF no longer needs to maintain state information for a location session (e.g. for a UE 105), nor needs to interact with a GMLC (e.g. a GMLC 155) or UE (e.g. UE 105) at a location service level or supplementary service level. Additionally, with the 5GC CP (LMF based) location solution, it is possible to continue a location session for a UE 105 following inter-AMF handover or inter-AMF cell change without the need to restart the location session from the VGMLC (e.g. VGMLC 155V) or HGMLC (e.g. HGMLC 155H), as required with a traditional CP location solution. If desired, the LMF (e.g. LMF 152) and GMLC (e.g. GMLC 155) functions may be combined in the same entity to reduce impacts and eliminate the need to support an NGLg interface, except for the case where a PLMN chooses to support an optimization of direct interaction between an LMF in a VPLMN and an HGMLC. Direct location support in the HPLMN (e.g. HPLMN 140) is allowed, for the 5GC CP location solution, by the option of locating the LMF (e.g. LMF 152H) in the HPLMN, which may avoid a need to support an Lr (e.g. RLP) interface and may allow better customization of support for a UE 105 and external client 130, which may not be possible with a traditional CP location solution. Additionally, the 5GC CP location solution may be used in a hybrid manner to improve support of the OMA SUPL user plane solution by enabling a SUPL Location Platform (SLP) to have access to NG-RAN (e.g. NG-RAN 112) measurement data, e.g., for uplink positioning or to support downlink positioning, via performing the procedures of FIGS. 4-6 by the SLP in place of the LMF (e.g. LMF 152 in FIGS. 4-6). With such a hybrid solution, a SUPL SLP would be able to request location measurements for a target UE (e.g. UE 105) from the NG-RAN (e.g. NG-RAN 112), e.g. using NRPPa, as well as from the UE, e.g. using LPP or NPP.

In the 5GC CP location solution, the LMF (e.g. LMF 152) impacts may be increased compared to a traditional AMF based CP location solution. The LMF impacts, for example, may include support of location privacy and management of an MT-LR, MO-LR and/or NI-LR procedure which are supported by an AMF for the traditional AMF based CP location solution for a 5G network. The 5GC CP location solution may not increase impacts to the NG-RAN (e.g., NG-RAN 112) compared to the traditional AMF based CP location solution. Moreover, with the 5GC CP location solution, impacts to the GMLC (e.g. GMLC 155) may be nearly the same as with the traditional AMF based CP location solution, except that the GMLC (instead of the AMF) may need to select the LMF (e.g. LMF 152) and possibly load share among LMFs. Further, impacts to the UE (e.g. UE 105) may be the same with both the 5GC CP location solution and the traditional AMF based CP location solution, except for triggered and periodic location. For triggered and periodic location, the 5GC CP location solution enables two procedures, as described previously for FIGS. 13 and 14, one of which (in FIG. 13) may be similar in complexity to that for the traditional AMF based CP location solution (e.g., requiring support of procedures and signaling for supplementary services by a UE and LMF), and the other of which (in FIG. 14) may be optimized for fewer signaling impacts for the LMF and UE. Additionally, with the 5GC CP location solution, impacts to support location continuity following handover of an emergency call may be similar to those for the traditional AMF based CP location solution. For intra-RAN handover of an emergency call (between AMFs) where a source LMF (e.g. LMF 152S) can access the target AMF (e.g. AMF 154T), the 5GC CP location solution can avoid reconfiguring the LRF and GMLCs (e.g. LRF 157 and GMLC 155S) and can continue an existing location session for a UE (e.g. UE 105). The 5GC CP location solution may also better enable caching of location information to assist subsequent location of a UE (e.g. UE 105) for the same emergency call. For a periodic and triggered location session, as exemplified in FIGS. 13 and 14, an LMF (e.g. LMF 152) may retain state information and continue to support each periodic or triggered event report from a UE (e.g. UE 105), which may reduce processing at the LMF 152 compared to processing at an LMF for the traditional AMF based CP location solution, where an LMF may have to be assigned and later released (e.g. by a serving AMF) for each separate location event report from a UE.

Figure 15:
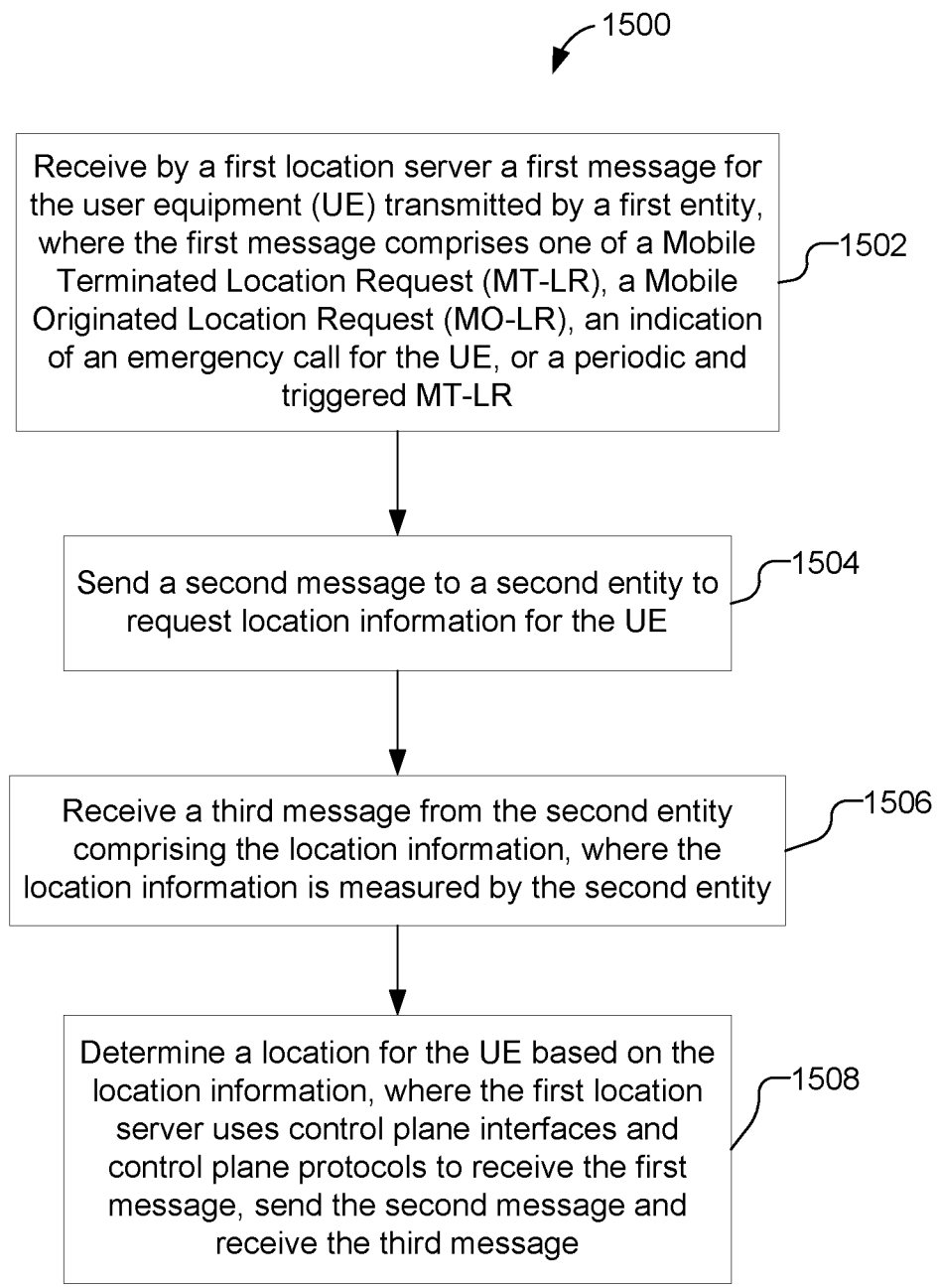
FIG. 15 shows a process flow illustrating a method for supporting location services for a UE by an LMF.

FIG. 15 shows a process flow 1500 illustrating a method for supporting location services for a user equipment (UE) such as the UE 105. Process flow 1500 may be performed by a location server, such an LMF (e.g. LMF 152) that supports the 5GC CP location solution discussed above. Process flow 1500 may start at block 1502, where a first location server (e.g. an LMF 152) receives a first message for the UE transmitted by a first entity, where the first message comprises one of a Mobile Terminated Location Request (MT-LR) (e.g. as at stage 4 or stage 5 of FIG. 11), a Mobile Originated Location Request (MO-LR) (e.g. as at stage 3 of FIG. 12), an indication of an emergency call for the UE (e.g. as at stage 2 of FIG. 7), or a periodic and triggered MT-LR (e.g. as at stage 4 or stage 5 of FIGS. 13 and 14). At block 1504, the first location server sends a second message to a second entity to request location information for the UE. At block 1506, the first location server receives a third message from the second entity comprising the location information, where the location information is measured by the second entity. At block 1508, the first location server determines a location for the UE based on the location information, where the first location server uses control plane interfaces (e.g. the interfaces designated as N2, NGLs, NGLg, Lr and NGLh in FIGS. 1-3) and control plane protocols (e.g. protocols similar to or the same as LPP, NPP, NGAP, NAS, ELP, SSP) to receive the first message, send the second message and receive the third message.

In one aspect of process flow 1500, the UE may be in communication with a Radio Access Network (RAN) (e.g. NG RAN 112) and the second entity may be the UE or the RAN. For example, the UE communication with the RAN may be based on a Next Generation RAN (NG-RAN) supporting a Fifth Generation (5G) radio interface such as NR. The first location server may be part of a 5G Core network (5GC) (e.g. 5GC 150). The first location server may be located in a home network for the UE (e.g. may correspond to LMF 152H in communication system 300), where the UE is roaming in a visited network (e.g. VPLMN 150) different from the home network (e.g. PLMN 140). In another example, the first location server is located in a serving network for the UE (e.g. 5GC 150).

In one aspect of process flow 1500, the second message and the third message may be messages for a positioning protocol. For example, the second entity may be the UE and the positioning protocol may be the Long Term Evolution (LTE) Positioning Protocol (LPP), a Next Generation (Next-Gen) Positioning Protocol (NPP) or a New Radio (NR) Positioning Protocol (NPP). For example, the first message may be the periodic and triggered MT-LR and the second message may be a request for periodic or triggered location information from the UE (e.g. as at stage 12 in FIG. 13 or stage 19 in FIG. 14). Further, receiving the third message (e.g. as at stage 19 in FIG. 13 or stage 21 in FIG. 14) may be based on detection by the UE of a periodic or triggered location event (e.g. as at stage 17 in FIG. 13 or stage 20 in FIG. 14). In another example, the second entity may be the RAN and the positioning protocol may be the Next Generation (NextGen) Positioning Protocol A (NPPa) or New Radio (NR) Positioning Protocol A (NRPPa), e.g. as defined in 3GPP TS 38.455. In one example, the second message may be sent to the second entity (e.g. when the second entity is the UE or an NG-RAN) and the third message may be received from the second entity via a serving Access and Mobility Management Function (AMF) for the UE (e.g. AMF 154).

In one aspect of process flow 1500, the first entity may be a second location server and the first message may be one of the MT-LR and the periodic and triggered MT-LR. For example, the second location server may be one of a Gateway Mobile Location Center (GMLC) (e.g. a GMLC 155) or a Service Capability Exposure Function (SCEF) (e.g. SCEF 159). In one example, the first location server may be combined with the second location server. This aspect of process flow 1500 may further include sending a fourth message to the second location server, where the fourth message comprises the location for the UE (e.g. as at stage 12 or stage 14 in FIG. 11, stage 22 or stage 24 in FIG. 13, or stage 23 or stage 25 in FIG. 14).

In another aspect of process flow 1500, the first entity may be an Access and Mobility Management Function (AMF) and the first message may be one of the MO-LR and the indication of the emergency call for the UE. For example, the first location server may receive the MO-LR from the UE via the AMF (e.g. as at stages 2 and 3 in FIG. 12). Alternatively, the first location server may receive the first message comprising the indication of the emergency call for the UE (e.g. as at stage 2 in FIG. 7) based on detection of the emergency call for the UE by the AMF (e.g. as at stage 1 in FIG. 7).

Figure 16:
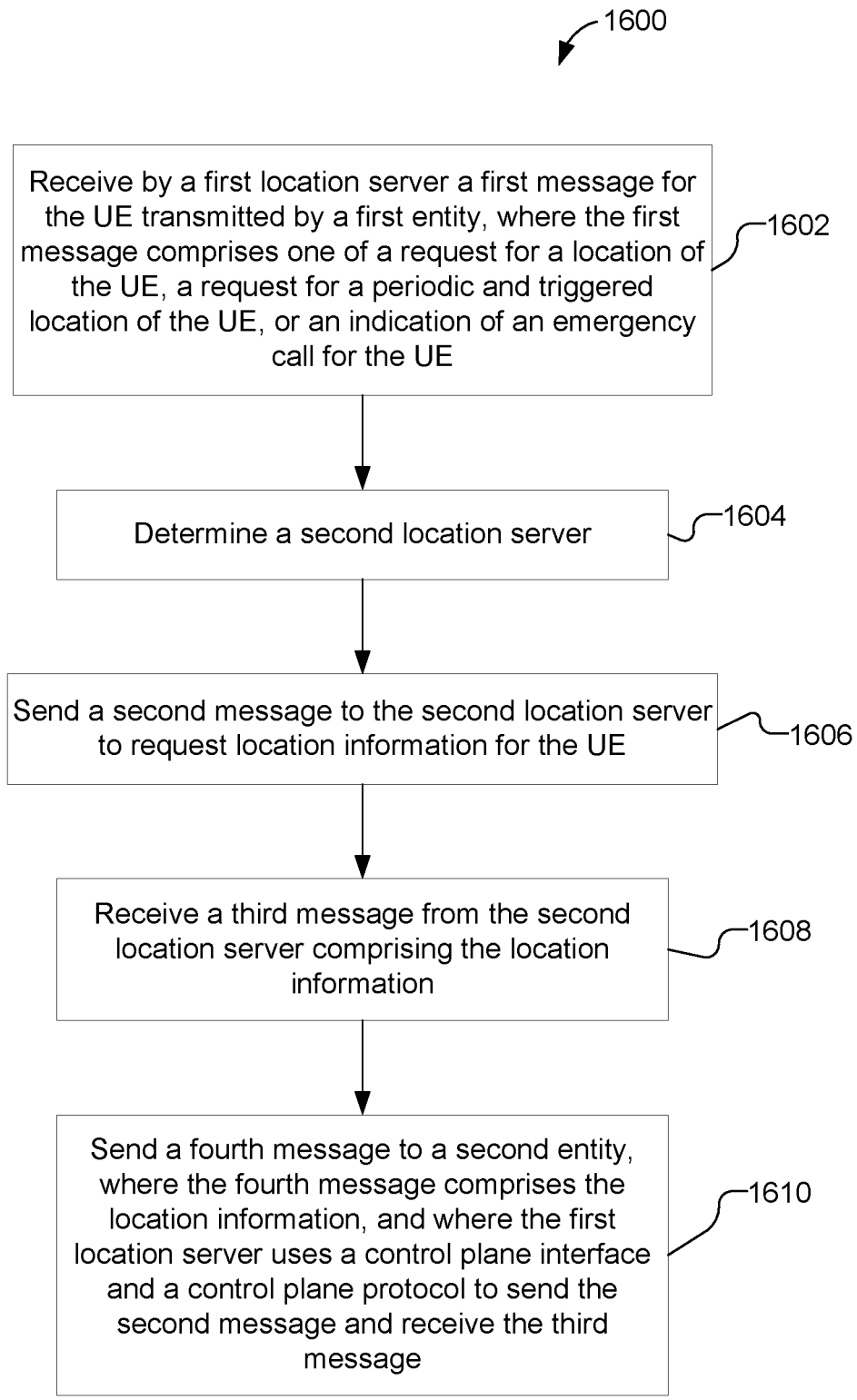
FIG. 16 shows a process flow illustrating another method for supporting location services for a UE by a Gateway Mobile Location Center (GMLC).

FIG. 16 shows a process flow 1600 illustrating another method of supporting location services for a user equipment (UE) such as UE 105. Process flow 1600 may be performed by a location server, such as a GMLC (e.g. a GMLC 155) or an SCEF (e.g. SCEF 159), that supports the 5GC CP location solution discussed above. Process flow 1600 may start at block 1602, where a first location server (e.g. a GMLC 155 or SCEF 159) receives a first message for the UE transmitted by a first entity, where the first message comprises one of a request for a location of the UE (e.g. as at stage 1 or stage 3 in FIG. 11), a request for a periodic and triggered location of the UE (e.g. as at stage 1 or stage 3 in FIG. 13 or FIG. 14), or an indication of an emergency call for the UE (e.g. as at stage 5 in FIG. 7). At block 1604, the first location server determines a second location server. At block 1606, the first location server sends a second message to the second location server to request location information for the UE (e.g. as at stage 2 in FIG. 8, or as at stage 3, 4 or 5 in FIG. 11, FIG. 13 or FIG. 14). At block 1608, the first location server receives a third message from the second location server comprising the location information (e.g. as at stage 7 in FIG. 8, as at stage 12, 13 or 14 in FIG. 11, as at stage 22, 23 or 24 in FIG. 13, or as at stage 23, 24 or 25 in FIG. 14). At block 1610, the first location server sends a fourth message to a second entity (e.g. as at stage 8 in FIG. 8, as at stage 13 or 15 in FIG. 11, as at stage 23 or 25 in FIG. 13, or as at stage 24 or 26 in FIG. 14), where the fourth message comprises the location information, and where the first location server uses a control plane interface (e.g. an NGLg or Le interface) and a control plane protocol (e.g. a protocol similar to or the same as ELP) to send the second message and receive the third message.

In some aspects of process flow 1600, the location information received at block 1608 includes a location estimate for the UE. The UE may be in communication with a Next Generation RAN (NG-RAN) (e.g. NG-RAN 112) supporting a Fifth Generation (5G) radio interface (e.g. NR). For example, the second location server may be a Location Management Function (LMF) (e.g. LMF 152).

In one aspect of process flow 1600, the first location server may be a Gateway Mobile Location Center (GMLC) (e.g. a GMLC 155), where the first message comprises the indication of the emergency call for the UE, and where determining the second location server comprises determining the second location server as being the same as the first entity. In this aspect, process flow 1600 may further include receiving a request for the location of the UE from a Location Retrieval Function (LRF) (e.g. LRF 157), where the second message is sent in response to receiving the request from the LRF, and where the second entity is the LRF.

In another aspect of process flow 1600, the first location server may be one of a Gateway Mobile Location Center (GMLC) (e.g. a GMLC 155) or a Service Capability Exposure Function (SCEF) (e.g. SCEF 159). In this aspect, the first entity may be one of a Services Capability Server (SCS), a GMLC (e.g. HGMLC 155H) or an external client (e.g. external client 130), and the first message may comprise one of the request for the location of the UE and the request for the periodic and triggered location of the UE, and where the second entity may be the same as the first entity. In this aspect, determining the second location server may be based, at least in part, on the first message. For example, the first message may include an address of the second location server, and determining the second location server may then be based on the address. In a second example, the first message may include at least one of an identity (ID) for the UE, a first address of a serving node for the UE and a location Quality of Service (QoS) for the UE, and determining the second location server may then be based, at least in part, on at least one of the ID, the first address and the QoS (e.g. as described in association with techniques T1, T2, T3 and T4 for stage 4 of FIG. 11). In this second example, the first message may include the ID and process flow 1600 may further include: sending a request to a Unified Data Management (UDM) (e.g. UDM 156), where the request comprises the ID; receiving a response from the UDM, where the response comprises a second address; and determining the second location server based, at least in part, on at least one of the second address and the QoS (e.g. as described for technique T4 for FIG. 11). For example, the second address may be an address of the serving node for the UE or may be an address for the second location server. In this aspect, the serving node for the UE may be an Access and Mobility Management Function (AMF) (e.g. AMF 154).

In another aspect of process flow 1600, the first location server may be located in a home network for the UE (e.g. HPLMN 5GC 140), where the UE is roaming in a visited network (e.g. VPLMN 150) different from the home network. In this aspect, the second location server may be located in the visited network or in the home network.

In another aspect of process flow 1600, the first location server and the second location server may be located in a serving network for the UE (e.g. 5GC 150). In one aspect, the first location server may be combined with the second location server.

Figure 17:
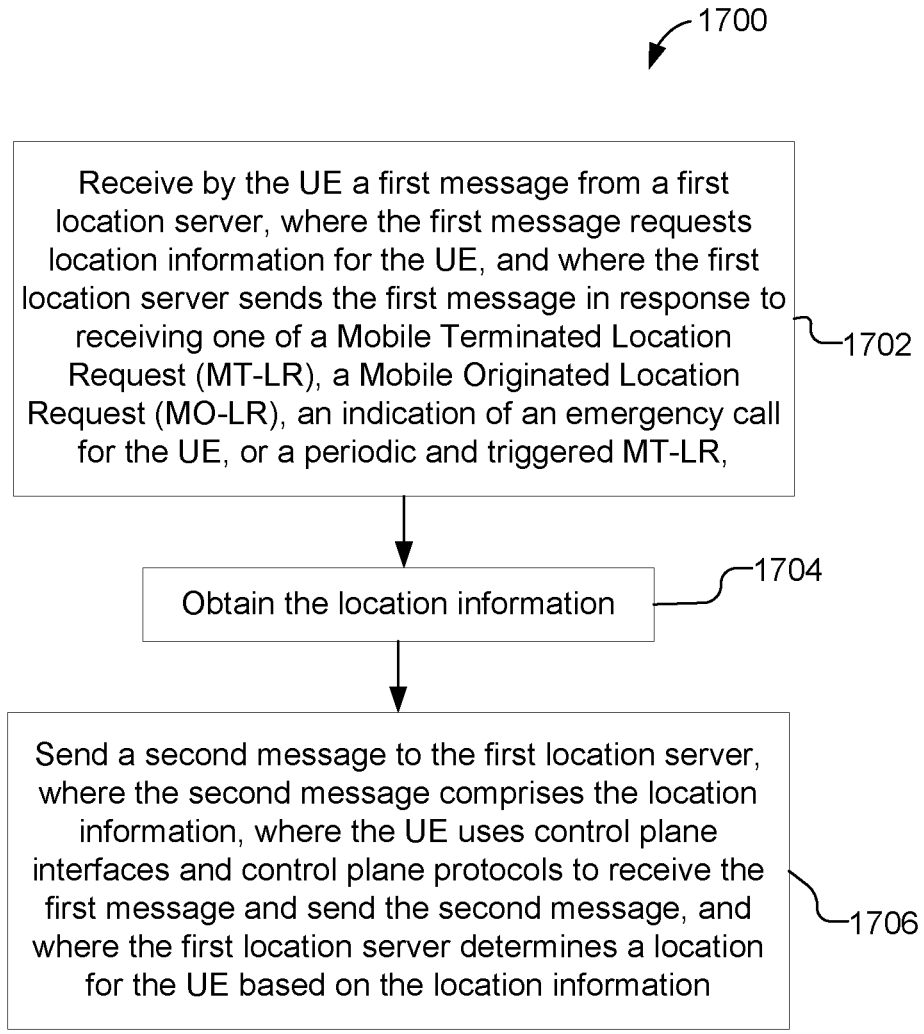
FIG. 17 shows a process flow illustrating another method for supporting location services for a UE by a UE.

FIG. 17 shows a process flow 1700 illustrating another method of supporting location services for a user equipment (UE) such as UE 105. Process flow 1700 may be performed by a UE (e.g. UE 105) that supports the 5GC CP location solution discussed above. Process flow 1700 may start at block 1702, where the UE receives a first message from a first location server, where the first message requests location information for the UE. The first location server may send the first message in response to receiving one of a Mobile Terminated Location Request (MT-LR) (e.g. as at stage 4 or stage 5 of FIG. 11), a Mobile Originated Location Request (MO-LR) (e.g. as at stage 3 of FIG. 12), an indication of an emergency call for the UE (e.g. as at stage 2 of FIG. 7), or a periodic and triggered MT-LR (e.g. as at stage 4 or stage 5 of FIGS. 13 and 14), At block 1704, the UE obtains the location information. At block 1706, the UE sends a second message to the first location server, where the second message comprises the location information, and where the UE uses control plane interfaces (e.g. an N2 interface, an NGLs interface and/or an NR or LTE radio interface) and control plane protocols (e.g. NAS, SSP, LPP or NPP) to receive the first message and send the second message. The first location server may then determine a location for the UE based on the location information.

In some aspects of process flow 1700, the UE may be in communication with a Next Generation RAN (NG-RAN) (e.g. NG-RAN 112) supporting a Fifth Generation (5G) radio interface (e.g. NR). For example, the first location server may be a Location Management Function (LMF) (e.g. LMF 152). The first location server may be part of a 5G Core network (5GC) (e.g. 5GC 150). For example, the first location server may be located in a home network for the UE (e.g. HPLMN 5GC 140), where the UE is roaming in a visited network (e.g. VPLMN 150) different from the home network. In another example, the first location server may be located in a serving network for the UE (e.g. 5GC 150).

In some aspects of process flow 1700, the first message and the second message may be messages for a positioning protocol. For example, the positioning protocol may be the Long Term Evolution (LTE) Positioning Protocol (LPP), a Next Generation (NextGen) Positioning Protocol (NPP) or a New Radio (NR) Positioning Protocol (NPP). The first message may be received by the UE and the second message may be sent from the UE via a serving Access and Mobility Management Function (AMF) for the UE (e.g. AMF 154). In one aspect, the first location server receives the periodic and triggered MT-LR, and the first message may then be a request for periodic or triggered location information from the UE. In this aspect, process flow 1700 may further include detecting a periodic or triggered location event by the UE, where sending the second message at block 1706 is based on detecting the periodic or triggered location event.

In another aspect of process flow 1700, the first location server may receive one of the MT-LR and the periodic and triggered MT-LR from a second location server. For example, the second location server may be a Gateway Mobile Location Center (GMLC) (e.g. a GMLC 155) or a Service Capability Exposure Function (SCEF) (e.g. SCEF 159). The first location server may also be combined with the second location server. In this other aspect, the first location server may further send a third message to the second location server, where the third message comprises the location for the UE.

In another aspect of process flow 1700, the first location server may receive one of the MO-LR and the indication of the emergency call for the UE from an Access and Mobility Management Function (AMF) (e.g. AMF 154). For example, the AMF may receive the MO-LR from the UE. Alternatively, the first location server may receive the indication of the emergency call for the UE based on detection of the emergency call for the UE by the AMF.

Figure 18:
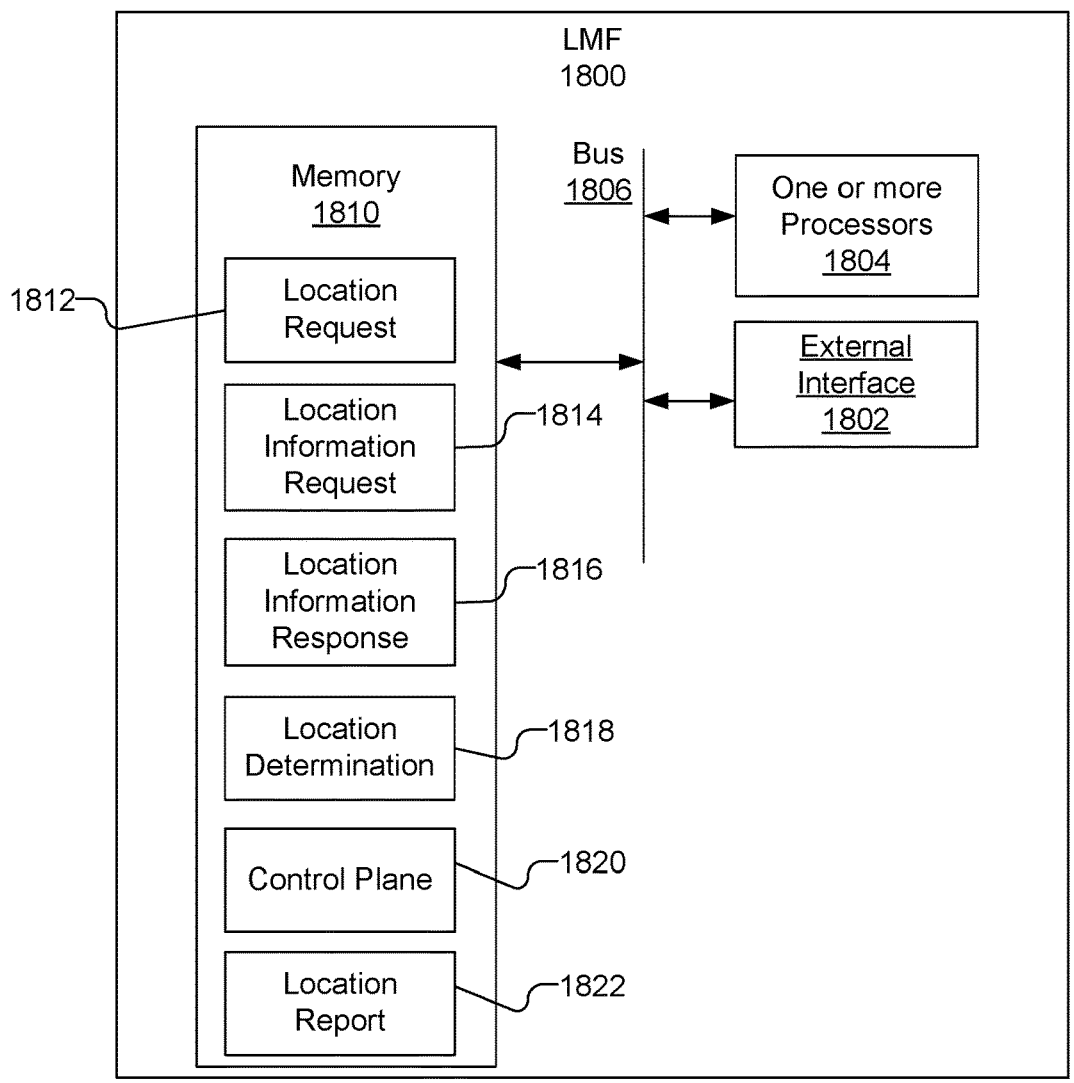
FIG. 18 is a block diagram of an embodiment of an LMF capable of supporting location services for a UE.

FIG. 18 is a diagram illustrating an example of a hardware implementation of an LMF 1800, such as LMF 152 shown in FIGS. 1-3. The LMF 1800 may be, e.g., part of a wireless network such as a 5G Core network (5GC). The LMF 1800 includes, e.g., hardware components such as an external interface 1802, which may be a wired or wireless interface capable of connecting to a GMLC, such as GMLC 155, VGMLC 155V or HGMLC 155H, and AMF 154. The LMF 1800 includes a one or more processors 1804 and memory 1810, which may be coupled together with bus 1806. The memory 1810 may contain executable code or software instructions that when executed by the one or more processors 1804 cause the one or more processors 1804 to operate as a special purpose computer programmed to perform the procedures and techniques disclosed herein.

As illustrated in FIG. 18, the memory 1810 includes one or more components or modules that when implemented by the one or more processors 1804 implements the methodologies described herein. While the components or modules are illustrated as software in memory 1810 that is executable by the one or more processors 1804, it should be understood that the components or modules may be dedicated hardware either in the processors 1804 or off processor. As illustrated, the memory 1810 may include a location request unit 1812 that enables the one or more processors 1804 to receive via the external interface 1802 and process a location request transmitted by an entity in the wireless network, such as another location server, e.g., a Gateway Mobile Location Center (GMLC), or an Access and Mobility Management Function (AMF). The location request may be in a message for e.g., a Mobile Terminated Location Request (MT-LR), a Mobile Originated Location Request (MO-LR), an indication of an emergency call for the UE, or a periodic and triggered MT-LR.

The memory 1810 may include a location information request unit 1814 that causes the one or more processors 1804 to send via the external interface 1802 a request for location information to another entity, such as the UE 105 or NG RAN 112, to obtain location information for the UE 105 based on the location request received by the location request unit 1812. For example, where the location request is for a periodic and triggered MT-LR, the location information request unit 1814 may cause a request for periodic or triggered location information to be sent to the UE 105. The request for location information may be sent to the other entity, e.g., the UE 105 or NG-RAN 112, via a serving Access and Mobility Management Function (AMF) for the UE 105 (e.g. the AMF 154). The request for location information may be sent in a message for a positioning protocol, such as the Long Term Evolution (LTE) Positioning Protocol (LPP), a Next Generation (NextGen) Positioning Protocol (NPP), a New Radio (NR) Positioning Protocol (NPP), a Next Generation (NextGen) Positioning Protocol A (NPPa), or a New Radio (NR) Positioning Protocol A (NRPPa).

The memory 1810 may additionally include a location information response unit 1816 that enables the one or more processors 1804 to receive via the external interface 1802 the requested location information measured by the other entity. The location information may be received from the other entity, e.g., the UE 105 or NG-RAN 112, via a serving Access and Mobility Management Function (AMF) for the UE (e.g. AMF 154). The received location information may be in a message for a positioning protocol, such as the Long Term Evolution (LTE) Positioning Protocol (LPP), a Next Generation (NextGen) Positioning Protocol (NPP), a New Radio (NR) Positioning Protocol (NPP), a Next Generation (NextGen) Positioning Protocol A (NPPa), or a New Radio (NR) Positioning Protocol A (NRPPa).

The memory 1810 may include a location determination unit 1818 that causes the one or more processors 1804 to determine a location for the UE using, at least in part, the location information received by the location information response unit 1816. For example, the location determination unit 1818 cause the one or more processors 1804 to determine an estimated location for the UE 105 using the received location information by using one or more position methods, such as, for example, GNSS, Assisted GNSS (A-GNSS), Advanced Forward Link Trilateration (AFLT), Observed Time Difference Of Arrival (OTDOA), WLAN or Enhanced Cell ID (ECID) or combinations thereof.

The memory 1810 may also include a control plane unit 1820 that causes the one or more processors 1804 to use control plane interfaces and control plane protocols to receive the location request, to send the request for location information, to receive the requested location information and to send a location report.

The memory 1810 may also include a location report unit 1822 that causes the one or more processors 1804 to send via the external interface 1802, the estimated location determined with location determination unit 1818 to the entity that transmitted the location request, which may be another location server.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1810) and executed by one or more processor units (e.g. processors 1804), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1810, and are configured to cause the one or more processors (e.g. processors 1804) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server (e.g. an LMF 152) capable of supporting location services for a user equipment (UE), may include a means for receiving by a first location server (e.g. an LMF 152) a first message for the UE transmitted by a first entity, wherein the first message comprises a Mobile Terminated Location Request (MT-LR), a Mobile Originated Location Request (MO-LR), an indication of an emergency call for the UE, or a periodic and triggered MT-LR, which may be, e.g., the external interface 1802 and one or more processors 1804 with dedicated hardware or implementing executable code or software instructions in memory 1810 such as the location request unit 1812. A means for sending a second message to a second entity to request location information for the UE may include, e.g., the external interface 1802 and one or more processors 1804 with dedicated hardware or implementing executable code or software instructions in memory 1810 such as the location information request unit 1814. Means for receiving a third message from the second entity comprising the location information, wherein the location information is measured by the second entity may include, e.g., the external interface 1802 and one or more processors 1804 with dedicated hardware or implementing executable code or software instructions in memory 1810 such as the location information response unit 1816. The first location server may use control plane interfaces and control plane protocols to receive the first message, send the second message and receive the third message. A means for determining a location for the UE based on the location information may be, e.g., the one or more processors 1804 with dedicated hardware or implementing executable code or software instructions in memory 1810 such as the location determination unit 1818.

The location server may further include a means for sending a fourth message to the second location server, wherein the fourth message comprises the location for the UE, which may be, e.g., the external interface 1802 and one or more processors 1804 with dedicated hardware or implementing executable code or software instructions in memory 1810 such as the location report unit 1822.

Figure 19:
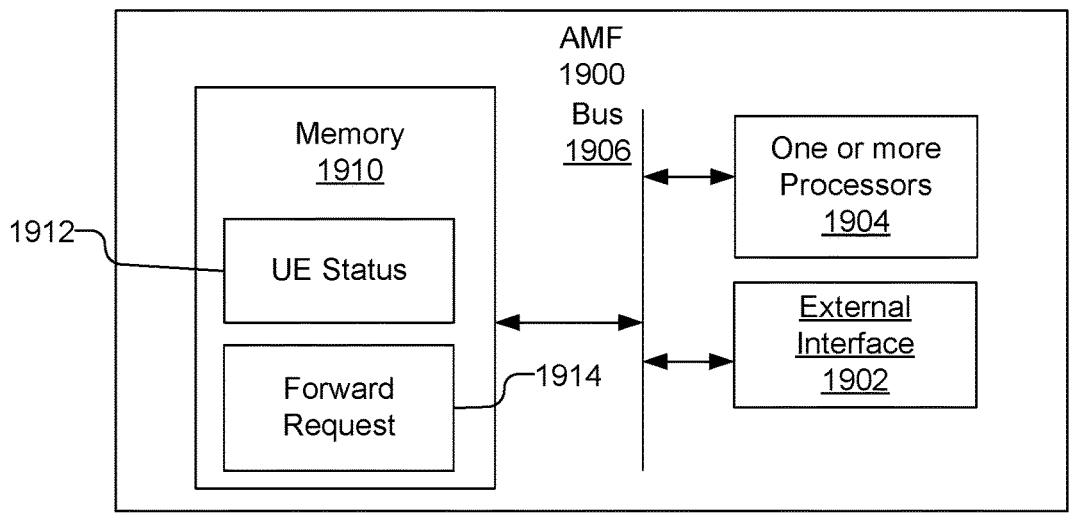
FIG. 19 is a block diagram of an embodiment of an Access and Mobility Management Function (AMF) capable of supporting location services for a UE.

FIG. 19 is a diagram illustrating an example of a hardware implementation of an AMF 1900, such as AMF 154 shown in FIGS. 1-3. The AMF 1900 includes, e.g., hardware components such as an external interface 1902, which may be a wired or wireless interface capable of connecting to an LMF, such as LMF 152 shown in FIGS. 1-3, and to NG RAN 112. The AMF 1900 includes a one or more processors 1904 and memory 1910, which may be coupled together with bus 1906. The memory 1910 may contain executable code or software instructions that when executed by the one or more processors 1904 cause the one or more processors 1904 to operate as a special purpose computer programmed to perform the procedures and techniques disclosed herein.

As illustrated in FIG. 19, the memory 1910 includes one or more components or modules that when implemented by the one or more processors 1904 implements the methodologies as described herein. While the components or modules are illustrated as software in memory 1910 that is executable by the one or more processors 1904, it should be understood that the components or modules may be dedicated hardware either in the processor or off processor. As illustrated, the memory 1910 may include a UE status unit 1912 that causes the one or more processors 1904 to receive via the external interface 1902 a status request for a UE 105 from an LMF 154, to page the UE 105 to place the UE 105 in a connected state and to forward the UE 105 status to the LMF 152. The memory 1910 may include a forward request unit 1914 that causes the one or more processors 1904 to receive via the external interface 1902 a location request such as a Mobile Originated Location Request (MO-LR) for a UE 105 or an indication of an emergency call for a UE 105 and to forward the location request or the indication of the emergency call to the LMF 152.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1910, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 20:
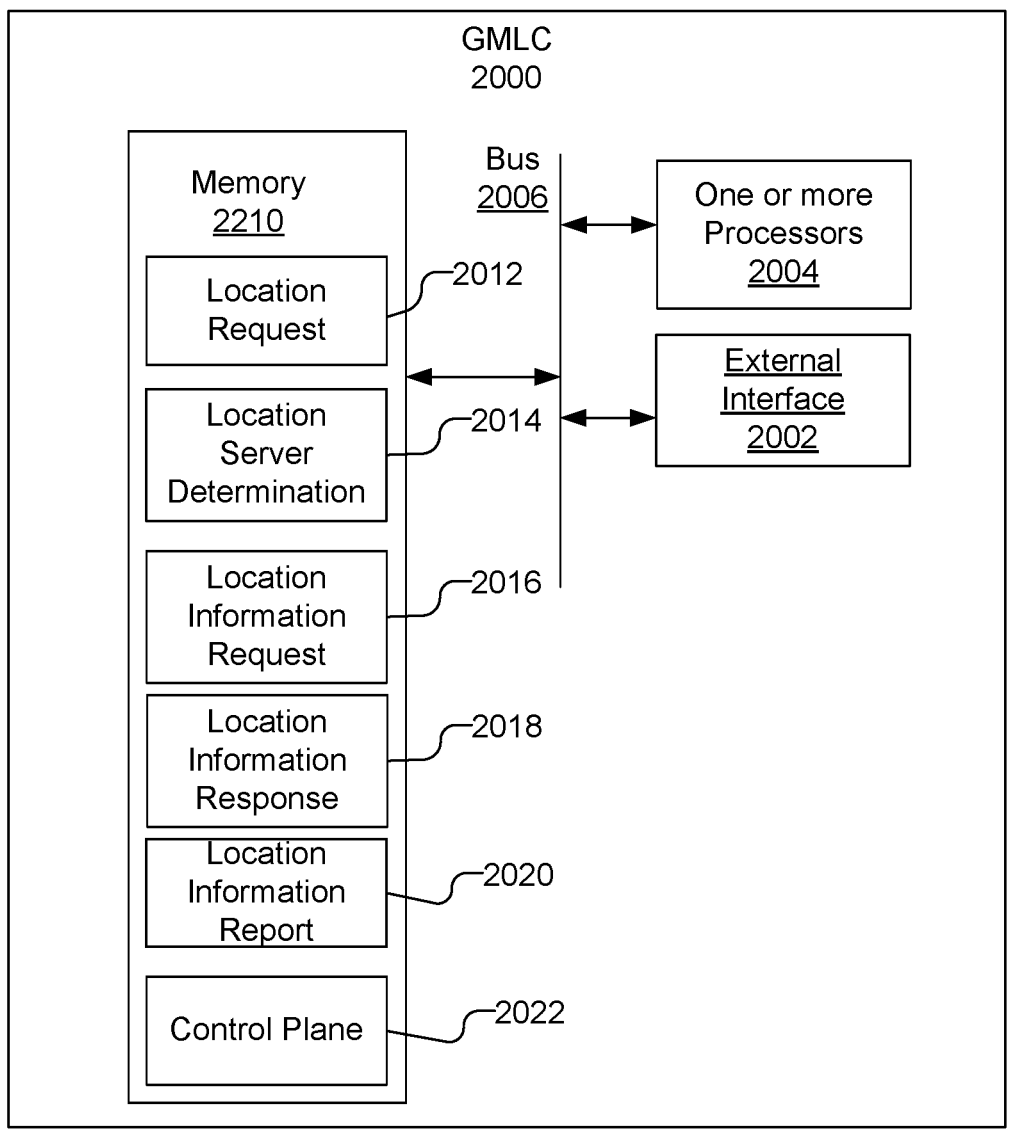
FIG. 20 is a block diagram of an embodiment of a GMLC capable of supporting location services for a UE.

FIG. 20 is a diagram illustrating an example of a hardware implementation of a GMLC 2000, such as GMLC 155 shown in FIGS. 1-3. GMLC 2000 in FIG. 20 may also be representative of an SCEF such as SCEF 159. The GMLC 2000 may be, e.g., part of a wireless network such as a 5G Core network (5GC). The GMLC 2000 includes, e.g., hardware components such as an external interface 2002, which may be a wired or wireless interface capable of connecting to an external client 130, to LMF 152 shown in FIGS. 1-3, to another GMLC, such as VGMLC 155V or HGLMC 155H, to UDM 156, LRF 157, and/or SCEF 159. The GMLC 2000 includes one or more processors 2004 and memory 2010, which may be coupled together with bus 2006. The memory 2010 may contain executable code or software instructions that when executed by the one or more processors 2004 cause the one or more processors to operate as a special purpose computer programmed to perform the procedures and techniques disclosed herein.

As illustrated in FIG. 20, the memory 2010 includes one or more components or modules that when implemented by the one or more processors 2004 implements the methodologies as described herein. While the components or modules are illustrated as software in memory 2010 that is executable by the one or more processors 2004, it should be understood that the components or modules may be dedicated hardware either in the processors 2004 or off processor. As illustrated, the memory 2010 may include a location request unit 2012 that enables the one or more processors 2004 to receive via the external interface 2002 and process a location request or indication of an emergency call transmitted by an entity in the network, e.g., another Gateway Mobile Location Center (e,g a GMLC 155), an external client 130, an SCEF 159, or an LMF 152. The location request may be in a message for e.g., a request for a location of a UE 105, a request for a periodic and triggered location of a UE 105, or an indication of an emergency call for a UE 105.

The memory 2010 may include a location server determination unit 2014 that causes the one or more processors 2004 to determine a second location server, which may be, e.g., a Location Management Function (e,g, LMF 152). The one or more processors 2004 may determine the second location server based, at least in part, on the received location request or indication of the emergency call. For example, the received location request or indication of the emergency call may include an address of the second location server which is used to determine the second location server. In another example, the received location request may include at least one of an identity (ID) for the UE 105, a first address of a serving node, e.g., an Access and Mobility Management Function (e.g. AMF 105), for the UE 105 and a location Quality of Service (QoS) for the UE 105, and the second location server is determined based, at least in part, on at least one of the ID, the first address and the QoS. For example, where the location request includes the ID for the UE, the location server determination unit 2014 may cause the one or more processors 2004 to cause the external interface 2002 to transmit a request to a Unified Data Management (e.g. UDM 156), that includes the ID for the UE, to receive a response from the UDM that includes a second address, wherein the second location server is determined based, at least in part, on at least one of the second address and the QoS.

The memory 2010 may include a location information request unit 2016 that causes the one or more processors 2004 to send via the external interface 2002 a request for location information to the second location server to request location information for the UE 105. The memory 2010 may include a location information response unit 2018 that enables the one or more processors 2004 to receive via the external interface 2002 the location information requested from the second location server. The memory 2010 may include a location information report unit 2020 that enables the one or more processors 2004 to send via the external interface 2002 the location information received from the second location server to another entity. The memory 2010 may also include a control plane unit 2022 that causes the one or more processors 2004 to use control plane interfaces and control plane protocols to receive the location request, to send the request for location information, to receive the requested location information and to send the location report.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2010, and are configured to cause the one or more processors 2004 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server (e.g. a GMLC 155 or SCEF 159) capable of supporting location services for a user equipment (e.g. UE 105), may include a means for receiving by a first location server (e.g. a GMLC 155 or SCEF 159) a first message for the UE transmitted by a first entity, wherein the first message comprises one of a request for a location of the UE, a request for a periodic and triggered location of the UE, or an indication of an emergency call for the UE, which may be, e.g., the external interface 2002 and one or more processors 2004 with dedicated hardware or implementing executable code or software instructions in memory 2010 such as the location request unit 2012. A means for determining a second location server may be, e.g., the one or more processors 2004 with dedicated hardware or implementing executable code or software instructions in memory 2010 such as the location server determination unit 2014 and may further include the external interface 2002. A means for sending a second message to the second location server to request location information for the UE may be, e.g., the external interface 2002 and one or more processors 2004 with dedicated hardware or implementing executable code or software instructions in memory 2010 such as the location information request unit 2016. A means for receiving a third message from the second location server comprising the location information may be, e.g., the external interface 2002 and one or more processors 2004 with dedicated hardware or implementing executable code or software instructions in memory 2010 such as the location information response unit 2018. The first location server may use a control plane interface and a control plane protocol to send the second message and receive the third message. A means for sending a fourth message to a second entity, the fourth message comprising the location information may be, e.g., the external interface 2002 and one or more processors 2004 with dedicated hardware or implementing executable code or software instructions in memory 2010 such as the location information report unit 2020.

The location server may further include a means for sending a request to a Unified Data Management (e.g. UDM 156), the request comprising an identity (ID) for the UE received in the first message along with a first address of a serving node for the UE and a location Quality of Service (QoS) for the UE, which may be, e.g., the external interface 2002 and one or more processors 2004 with dedicated hardware or implementing executable code or software instructions in memory 2010 such as the location server determination unit 2014. A means for receiving a response from the UDM, the response comprising a second address may be, e.g., the external interface 2002 and one or more processors 2004 with dedicated hardware or implementing executable code or software instructions in memory 2010 such as the location server determination unit 2014. The second location server may then be determined based, at least in part, on at least one of the second address and the QoS.

Figure 21:
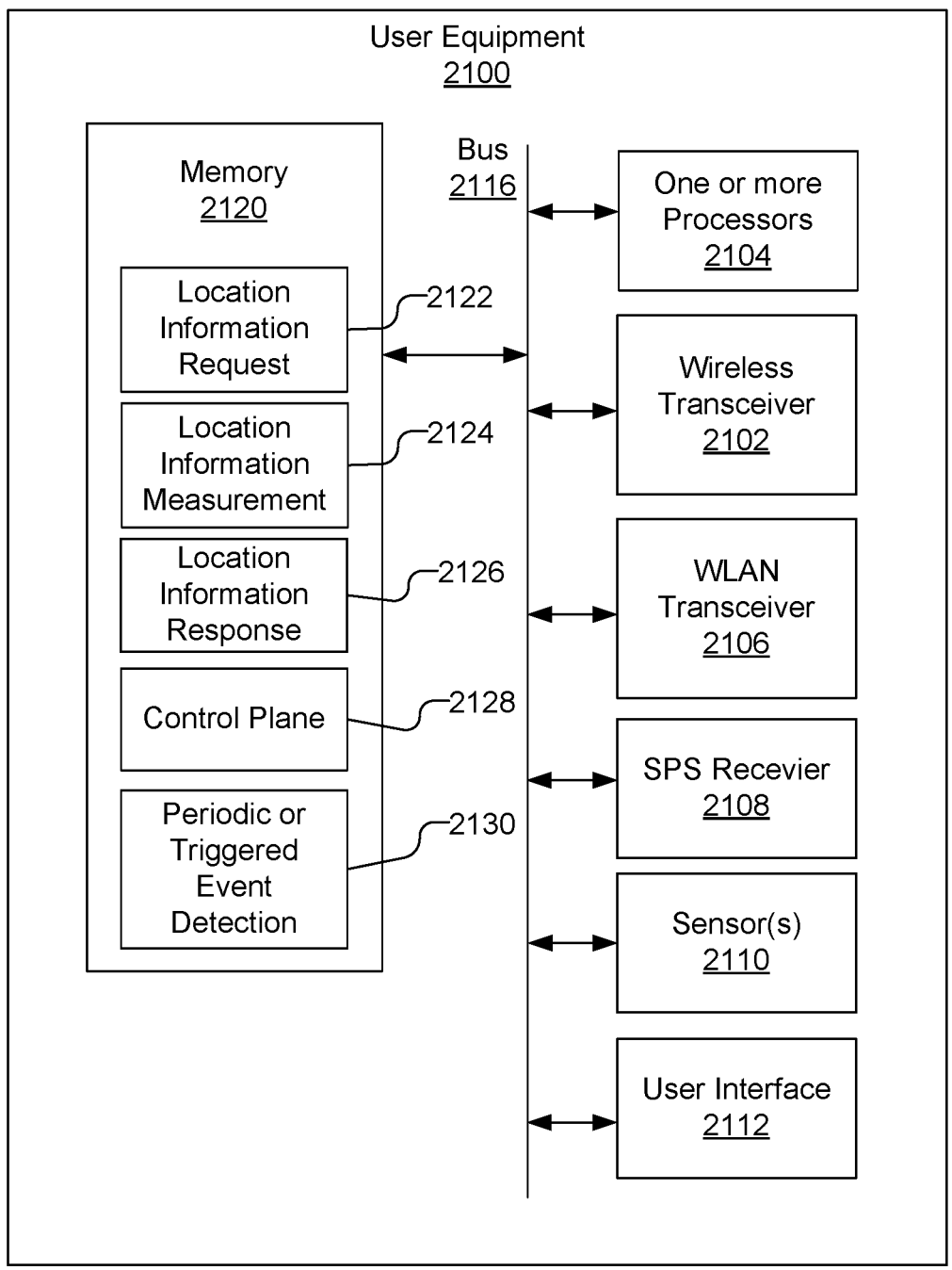
FIG. 21 is a block diagram of an embodiment of a UE capable of supporting location services for the UE.

FIG. 21 is a diagram illustrating an example of a hardware implementation of UE 2100, such as UE 105 shown in FIGS. 1-3. The UE 2100 may include a wireless transceiver 2102 to wirelessly communicate with an NG-RAN 112, e.g., base stations such as gNB 110 or ng-eNB 114 (shown in FIGS. 1-3). The UE 2100 may also include additional transceivers, such a wireless local area network (WLAN) transceiver 2106, as well as an SPS receiver 2108 for receiving and measuring signals from SPS SVs 190 (shown in FIGS. 1-3). The UE 2100 may further include one or more sensors 2110, such as cameras, accelerometers, gyroscopes, electronic compass, magnetometer, barometer, etc. The UE 2100 may further include a user interface 2112 that may include e.g., a display, a keypad or other input device, such as virtual keypad on the display, through which a user may interface with the UE 2100. The UE 2100 further includes one or more processors 2104 and memory 2120, which may be coupled together with bus 2116. The one or more processors 2104 and other components of the UE 2100 may similarly be coupled together with bus 2116, a separate bus, or may be directly connected together or coupled using a combination of the foregoing. The memory 2120 may contain executable code or software instructions that when executed by the one or more processors 2104 cause the one or more processors to operate as a special purpose computer programmed to perform the algorithms disclosed herein.

As illustrated in FIG. 21, the memory 2120 may include one or more components or modules that may be implemented by the one or more processors 2104 to perform the methodologies described herein. While the components or modules are illustrated as software in memory 2120 that is executable by the one or more processors 2104, it should be understood that the components or modules may be dedicated hardware either in the one or more processors 2104 or off the processors. As illustrated, the memory 2120 may include a location information request unit 2122 that enables the one or more processors 2104 to receive via the wireless transceiver 2102 and process a request for location information for the UE 2100 transmitted by a location server, e.g., Location Management Function (e.g. LMF 152). The location server sends the request for location information to the UE 2100 in response to receiving one of a Mobile Terminated Location Request (MT-LR), a Mobile Originated Location Request (MO-LR), an indication of an emergency call for the UE 2100, or a periodic and triggered MT-LR.

The memory 2120 may include a location information measurement unit 2124 that causes the one or more processors 2104 to obtain the requested location information. The memory 2110 may additionally include a location information response unit 2126 that causes the one or more processors 2104 to send via the wireless transceiver 2102 the requested location information to the location server. The location server determines a location for the UE 2100 based on the location information sent by the UE 2100. The memory 2120 may also include a control plane unit 2128 that causes the one or more processors 2104 to use control plane interfaces and control plane protocols to receive the location information request and to send the location information response.

The memory 2120 may also include a periodic or triggered event detection unit 2130 that causes the one or more processors 2104 to monitor and detect periodic or triggered events. The periodic or triggered event detection unit 2130 when implemented by the one or more processors 2104 configures the one or more processors 2104 to receive and monitor trigger parameters, e.g., provided in the request for location information from the location server. The trigger parameters may include, e.g., a trigger evaluation interval, a periodic maximum reporting interval, and one or more location triggers, such as a change of location, an entry into, an exit from or a remaining within a defined geographic area, a movement by more than a threshold linear distance from a previous location, etc. When a trigger event is detected, the location information measurement unit 2124 may cause the one or more processors 2104 to obtain the requested location information and the location information response unit 2126 causes the location information to be sent.

The methodologies described herein may be implemented by various means depending upon the application. For example, these methodologies may be implemented in hardware, firmware, software, or any combination thereof. For a hardware implementation, the one or more processors 2104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 2100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2120) and executed by one or more processors 2104, causing the one or more processors 2104 to operate as a special purpose computer programmed to perform the techniques disclosed herein. Memory may be implemented within the one or processors 2104 or external to the one or more processors 2104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 2100 may be stored as one or more instructions or code on a non-transitory computer-readable storage medium such as memory 2120. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 2100 may be provided as signals on transmission media included in a communication apparatus. For example, a communication apparatus comprising part or all of UE 2100 may include a transceiver having signals indicative of instructions and data. The instructions and data are stored on non-transitory computer readable media, e.g., memory 2120, and are configured to cause the one or more processors 2104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment 2100 (e.g. a UE 105) may include a means for receiving a first message from a first location server, the first message requesting location information for the UE 2100, which may be, e.g., the wireless transceiver 2102 and one or more processors 2104 with dedicated hardware or implementing executable code or software instructions in memory 2120 such as the location information request unit 2122. A means for obtaining the location information may be, e.g., the wireless transceiver 2102 and one or more processors 2104 with dedicated hardware or implementing executable code or software instructions in memory 2120 such as the location information measurement unit 2124. A means for sending a second message to the first location server, the second message comprising the location information, wherein the UE 2100 uses control plane interfaces and control plane protocols to receive the first message and send the second message may be, e.g., the wireless transceiver 2102 and one or more processors 2104 with dedicated hardware or implementing executable code or software instructions in memory 2120 such as the location information response unit 2126.

The UE 2100 may further include a means for detecting a periodic or triggered location event, which may be, e.g., the wireless transceiver 2102 and one or more processors 2104 with dedicated hardware or implementing executable code or software instructions in memory 2120 such as the periodic or triggered event determination unit 2130.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) comprising:
    receiving by a first location server a first message for the UE transmitted by a first entity, wherein the first entity is a core network node, wherein the first message comprises a Mobile Originated Location Request (MO-LR);
    receiving by the first location server status information for the UE from the first entity, the status information comprising a local UE ID assigned by the first entity, wherein the status information further comprises a Cell ID;
    sending a second message to a second entity based on the status information to request location information for the UE;
    receiving a third message from the second entity comprising the location information, wherein the location information is measured by the second entity; and
    determining a location for the UE based on the location information, wherein the first location server uses control plane interfaces and control plane protocols to receive the first message, send the second message and receive the third message.

2. The method of claim 1, wherein the UE is in communication with a Radio Access Network (RAN) and the second entity comprises the UE or the RAN, wherein the RAN is a Next Generation RAN (NG-RAN) supporting a Fifth Generation (5G) radio interface, and the first location server is part of a 5G Core network (5GC).

3. The method of claim 1, wherein the first location server is located in a home network for the UE, wherein the UE is roaming in a visited network different from the home network.

4. The method of claim 1, wherein the second message and the third message are messages for a positioning protocol.

5. The method of claim 4, wherein the second entity is the UE and the positioning protocol is a Long Term Evolution (LTE) Positioning Protocol (LPP), a Next Generation (NextGen) Positioning Protocol (NPP) or a Previously Presented Radio (NR) Positioning Protocol (NPP).

6. The method of claim 4, wherein the second entity is the RAN and the positioning protocol is a Next Generation (NextGen) Positioning Protocol A (NPPa) or Previously Presented Radio (NR) Positioning Protocol A (NRPPa).

7. The method of claim 4, wherein the second message is sent to the second entity and the third message is received from the second entity via a serving Access and Mobility Management Function (AMF) for the UE.

8. The method of claim 1, wherein the core network node is an Access and Mobility Management Function (AMF).

9. A first location server for supporting location services for a user equipment (UE) comprising:
    an external interface for receiving and sending messages to entities in a network; and
    at least one processor coupled to the external interface, the at least one processor configured to receive a first message for the UE transmitted by a first entity in the network wherein the first entity is a core network node, wherein the first message comprises a Mobile Originated Location Request (MO-LR), receive by the first location server status information for the UE from the first entity, the status information comprising a local UE ID assigned by the first entity, wherein the status information further comprises a Cell ID; sending a second message to a second entity in the network based on the status information to request location information for the UE, receive a third message from the second entity comprising the location information, wherein the location information is measured by the second entity, and determine a location for the UE based on the location information, wherein the first location server uses control plane interfaces and control plane protocols to receive the first message, send the second message and receive the third message.

10. The first location server of claim 9, wherein the UE is in communication with a Radio Access Network (RAN) and the second entity comprises the UE or the RAN, wherein the RAN is a Next Generation RAN (NG-RAN) supporting a Fifth Generation (5G) radio interface and the first location server is part of a 5G Core network (5GC).

11. The first location server of claim 9, wherein the first location server is located in a home network for the UE, wherein the UE is roaming in a visited network different from the home network.

12. The first location server of claim 9, wherein the second message and the third message are messages for a positioning protocol.

13. The first location server of claim 12, wherein the second entity is the UE and the positioning protocol is a Long Term Evolution (LTE) Positioning Protocol (LPP), a Next Generation (NextGen) Positioning Protocol (NPP) or a Previously Presented Radio (NR) Positioning Protocol (NPP).

14. The first location server of claim 12, wherein the second entity is the RAN and the positioning protocol is a Next Generation (NextGen) Positioning Protocol A (NPPa) or Previously Presented Radio (NR) Positioning Protocol A (NRPPa).

15. The first location server of claim 12, wherein the second message is sent to the second entity and the third message is received from the second entity via a serving Access and Mobility Management Function (AMF) for the UE.

16. The first location server of claim 9, wherein the core network node is an Access and Mobility Management Function (AMF).

17. A first location server for supporting location services for a user equipment (UE) comprising:
 means for receiving by a first location server a first message for the UE transmitted by a first entity, wherein the first entity is a core network node, wherein the first message comprises a Mobile Originated Location Request (MO-LR);
 means for receiving by the first location server status information for the UE from the first entity, the status information comprising a local UE ID assigned by the first entity, wherein the status information further comprises a Cell ID;
 means for sending a second message to a second entity based on the status information to request location information for the UE;
 means for receiving a third message from the second entity comprising the location information, wherein the location information is measured by the second entity; and
 means for determining a location for the UE based on the location information, wherein the first location server uses control plane interfaces and control plane protocols to receive the first message, send the second message and receive the third message.

18. The first location server of claim 17, wherein the UE is in communication with a Radio Access Network (RAN) and the second entity comprises the UE or the RAN, wherein the RAN is a Next Generation RAN (NG-RAN) supporting a Fifth Generation (5G) radio interface, and the first location server is part of a 5G Core network (5GC).

19. The first location server of claim 17, wherein the first location server is located in a home network for the UE, wherein the UE is roaming in a visited network different from the home network.

20. The first location server of claim 17, wherein the second message and the third message are messages for a positioning protocol.

21. The first location server of claim 20, wherein the second entity is the UE and the positioning protocol is a Long Term Evolution (LTE) Positioning Protocol (LPP), a Next Generation (NextGen) Positioning Protocol (NPP) or a Previously Presented Radio (NR) Positioning Protocol (NPP).

22. The first location server of claim 20, wherein the second entity is the RAN and the positioning protocol is a Next Generation (NextGen) Positioning Protocol A (NPPa) or Previously Presented Radio (NR) Positioning Protocol A (NRPPa).

23. The first location server of claim 20, wherein the second message is sent to the second entity and the third message is received from the second entity via a serving Access and Mobility Management Function (AMF) for the UE.

24. The first location server of claim 17, wherein the core network node is an Access and Mobility Management Function (AMF).

25. A non-transitory storage medium including program code stored thereon, the program code is operable to configure at least one processor in a first location server for supporting location services for a user equipment (UE), the program code comprising instructions to:
 receive by a first location server a first message for the UE transmitted by a first entity, wherein the first entity is a core network node, wherein the first message comprises a Mobile Originated Location Request (MO-LR);
 receive by the first location server status information for the UE from the first entity, the status information comprising a local UE ID assigned by the first entity, wherein the status information further comprises a Cell ID;
 send a second message to a second entity based on the status information to request location information for the UE;
 receiving a third message from the second entity comprising the location information, wherein the location information is measured by the second entity; and
 determine a location for the UE based on the location information, wherein the first location server uses control plane interfaces and control plane protocols to receive the first message, send the second message and receive the third message.

26. The non-transitory storage medium including program code of claim 25, wherein the UE is in communication with a Radio Access Network (RAN) and the second entity comprises the UE or the RAN, wherein the RAN is a Next Generation RAN (NG-RAN) supporting a Fifth Generation (5G) radio interface, and the first location server is part of a 5G Core network (5GC).

27. The non-transitory storage medium including program code of claim 25, wherein the first location server is located in a home network for the UE, wherein the UE is roaming in a visited network different from the home network.

28. The non-transitory storage medium including program code of claim 25, wherein the second message and the third message are messages for a positioning protocol.

29. The non-transitory storage medium including program code of claim 28, wherein the second entity is the UE and the positioning protocol is a Long Term Evolution (LTE) Positioning Protocol (LPP), a Next Generation (NextGen) Positioning Protocol (NPP) or a Previously Presented Radio (NR) Positioning Protocol (NPP).

30. The non-transitory storage medium including program code of claim 28, wherein the second entity is the RAN and the positioning protocol is a Next Generation (NextGen) Positioning Protocol A (NPPa) or Previously Presented Radio (NR) Positioning Protocol A (NRPPa).

31. The non-transitory storage medium including program code of claim 28, wherein the second message is sent to the second entity and the third message is received from the second entity via a serving Access and Mobility Management Function (AMF) for the UE.

32. The non-transitory storage medium including program code of claim 25, wherein the core network node is an Access and Mobility Management Function (AMF).

33. The method of claim 1, wherein the status information is received in the first message or is received in response to a request for status information sent by the first location server to the first entity.

34. The first location server of claim 9, wherein the status information is received in the first message or is received in response to a request for status information sent by the first location server to the first entity.

35. The first location server of claim 17, wherein the status information is received in the first message or is received in response to a request for status information sent by the first location server to the first entity.

36. The non-transitory storage medium including program code of claim 25, wherein the status information is received in the first message or is received in response to a request for status information sent by the first location server to the first entity.

* * * * *